(12) United States Patent
Arimoto

(10) Patent No.: US 8,301,134 B2
(45) Date of Patent: Oct. 30, 2012

(54) MAIN DEVICE OF CORDLESS TELEPHONE SYSTEM

(75) Inventor: Hideki Arimoto, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 814 days.

(21) Appl. No.: 12/367,678

(22) Filed: Feb. 9, 2009

(65) Prior Publication Data

US 2009/0203330 A1 Aug. 13, 2009

(30) Foreign Application Priority Data

Feb. 7, 2008 (JP) ................................ 2008-027607

(51) Int. Cl.
*H04W 4/00* (2009.01)

(52) U.S. Cl. .................... 455/426.1; 455/90.2; 379/419; 370/311

(58) Field of Classification Search ................. 455/90.2, 455/426.1

See application file for complete search history.

(56) References Cited

U.S. PATENT DOCUMENTS

| | | | | | |
|---|---|---|---|---|---|
| 5,375,254 | A | * | 12/1994 | Owen | 455/525 |
| 5,790,279 | A | * | 8/1998 | Sakellaropoulos | 358/498 |
| 5,909,433 | A | * | 6/1999 | Haartsen | 370/337 |
| 2006/0080423 | A1 | * | 4/2006 | Brewer et al. | 709/223 |
| 2006/0089138 | A1 | * | 4/2006 | Smith et al. | 455/426.1 |
| 2007/0104179 | A1 | * | 5/2007 | Srinivasan et al. | 370/351 |
| 2008/0112340 | A1 | * | 5/2008 | Luebke | 370/310 |
| 2008/0159163 | A1 | * | 7/2008 | Valli | 370/252 |

FOREIGN PATENT DOCUMENTS

| | | |
|---|---|---|
| JP | H07-030478 A | 1/1995 |
| JP | H11-136181 A | 5/1999 |
| JP | 2004-265794 A | 9/2004 |
| JP | 2007-259366 A | 10/2007 |

\* cited by examiner

*Primary Examiner* — Charles Appiah
*Assistant Examiner* — Mazda Sabouri
(74) *Attorney, Agent, or Firm* — Baker Botts L.L.P.

(57) ABSTRACT

There is provided a main device of a cordless telephone system that performs communication with at least one additional device, each of which includes a search unit that intermittently searches for a radio wave generated from the main device, and a search stopping unit that stops execution of the search unit after a state in which the search unit does not receive a radio wave continues for a predetermined time. The main device includes a radio wave generating unit, an operation stopping unit that stops an operation of the radio wave generating unit, and a temporary returning unit that temporarlity recovers the operation of the radio wave generating unit and stops the operation of the radio wave generating unit after the additional device executes multiple searches by using the search unit after stopping the operation of the radio wave generating unit, but before the predetermined time elapses.

10 Claims, 17 Drawing Sheets

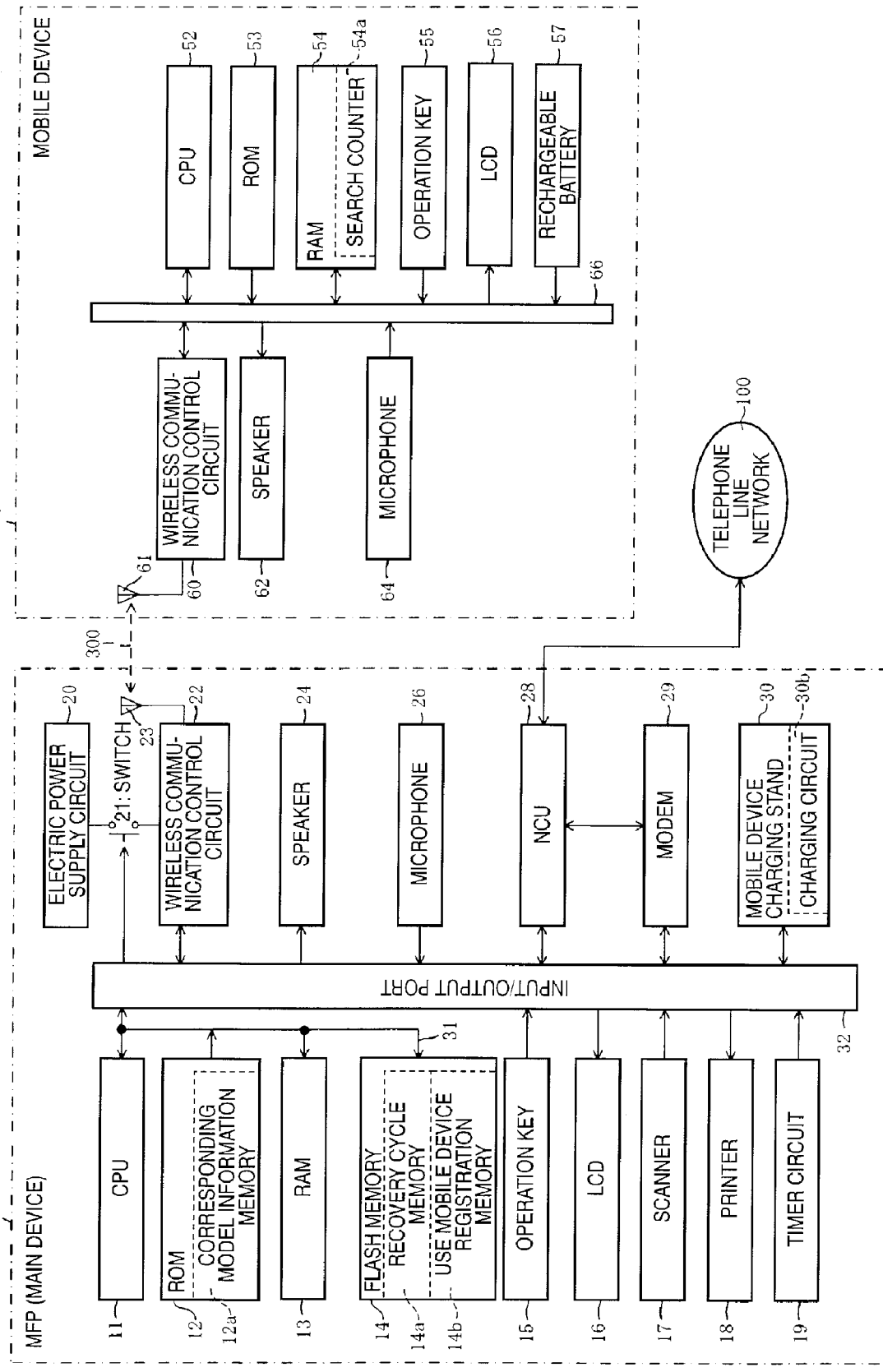

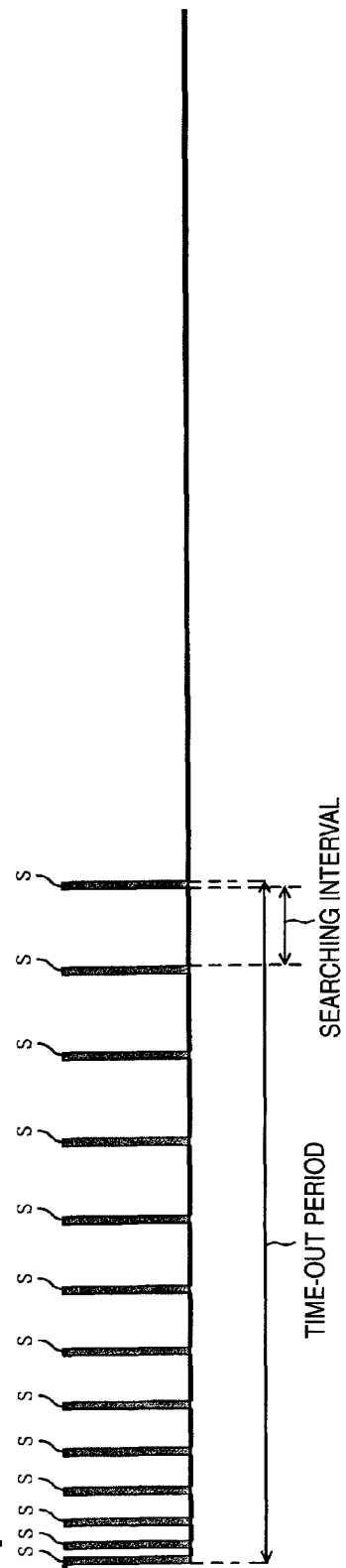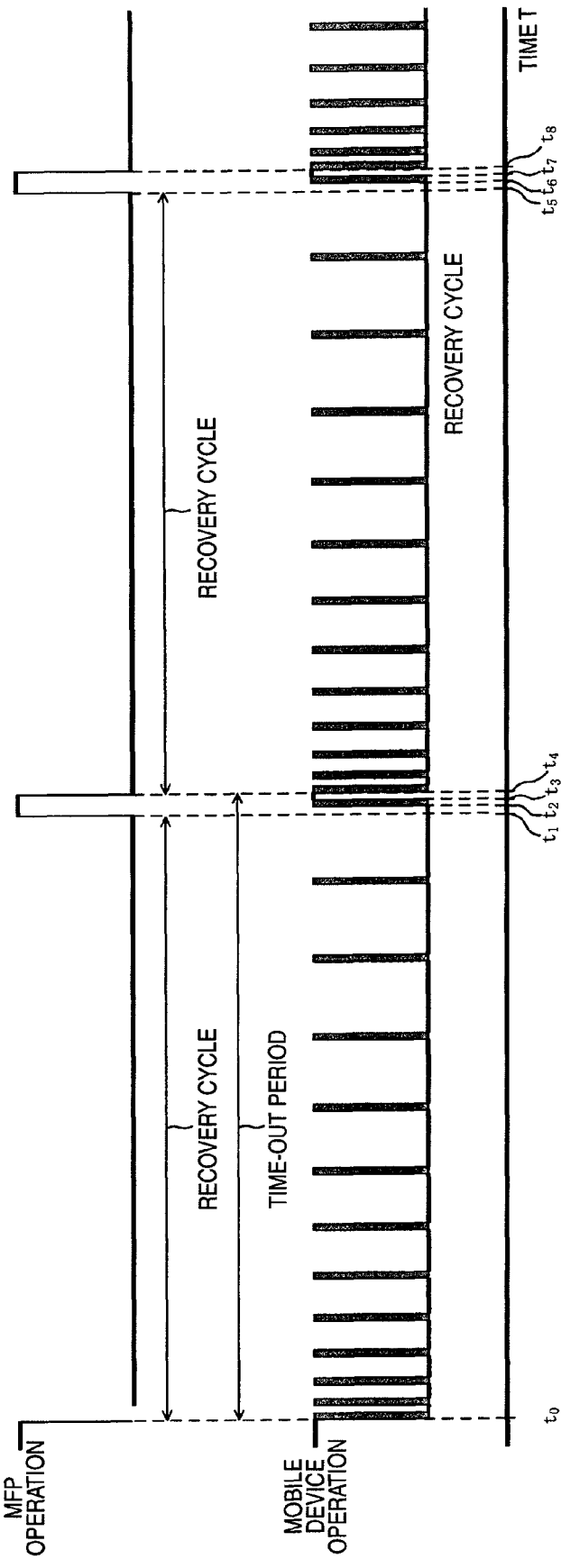

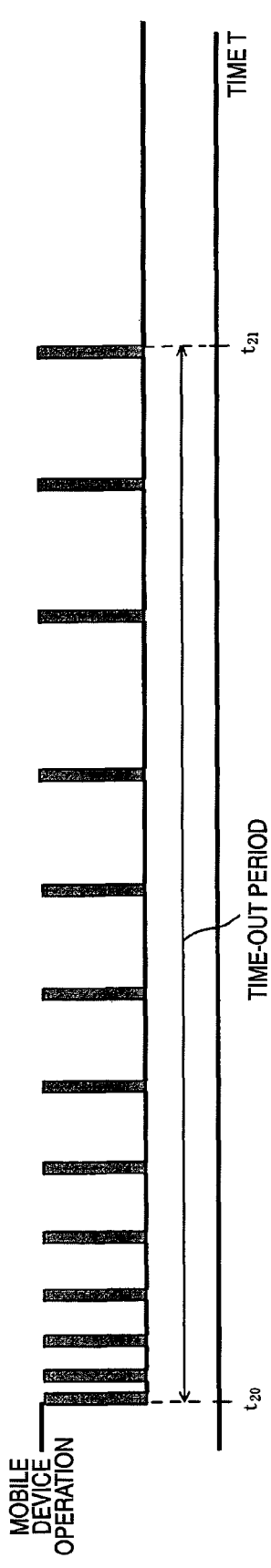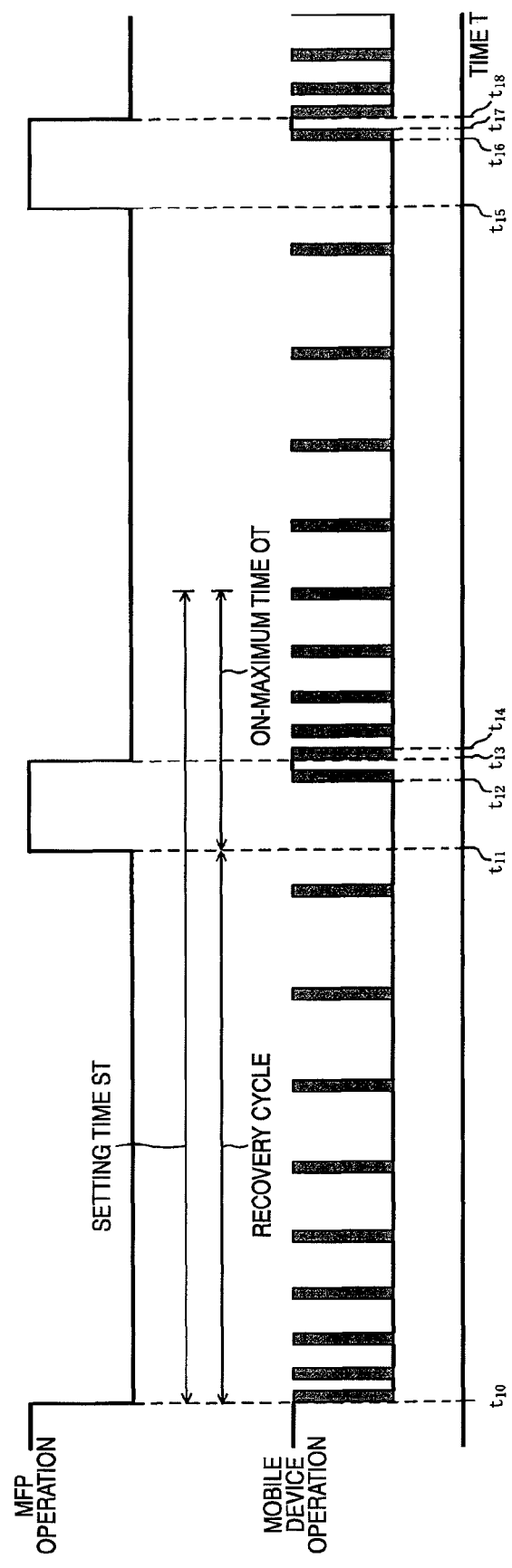

FIG. 8

| CONFIGURATION OF TEST CYCLE MEMORY |
|---|
| 1 |
| 2 |
| 3 |
| 4 |
| 5 |
| 6 |
| 7 |
| 8 |
| 9 |
| 10 |
| 15 |
| 20 |
| 25 |
| 30 |
| 35 |
| 40 |
| 45 |
| 50 |
| 60 |
| 70 |
| 80 |
| 90 |
| 100 |
| 120 |
| 140 |
| 160 |
| 180 |
| 200 |
| 250 |
| 300 |
| 350 |
| 400 |
| 450 |
| 500 |

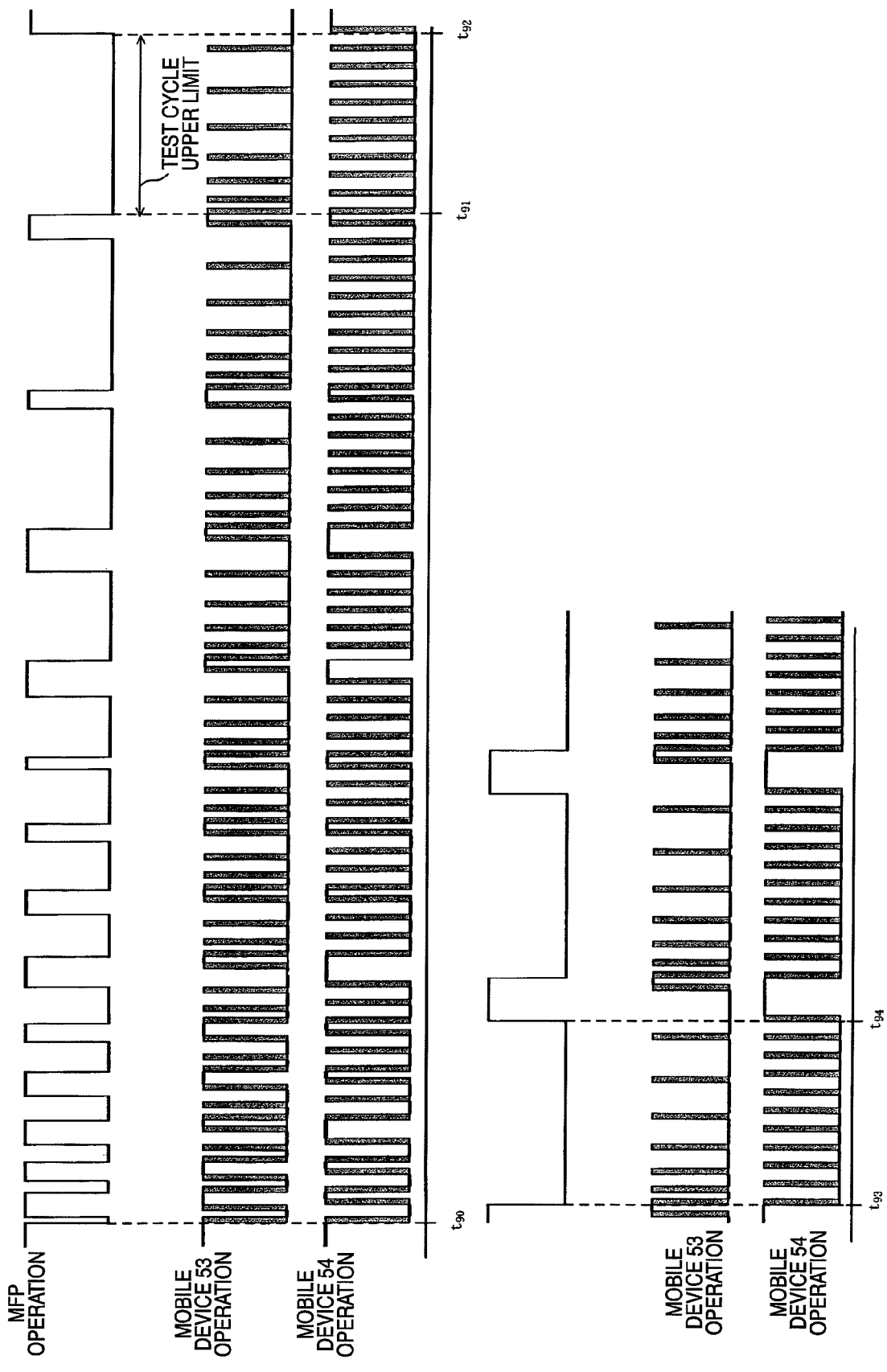

MAIN DEVICE OF CORDLESS TELEPHONE SYSTEM

This application claims priority from Japanese Patent Application No. 2008-027607 filed on Feb. 7, 2008, the entire subject matter of which is incorporated herein by reference.

TECHNICAL FIELD

Aspects of the invention relates to a main device of a cordless telephone system.

BACKGROUND

There has been proposed a related art telephone system capable of making a telephone call between a main device and a mobile device via wireless communication. In the related art telephone system, even when a telephone call is not performed with a mobile device, wireless communication is performed between a main device and the mobile device. Specifically, a synchronization signal is periodically transmitted and received between the main device and the mobile device, to keep a link between the main device and the mobile device.

Incidentally, there has been proposed a device configured to be set in a power save mode in order to save energy consumption of office automation equipment and the like which tend to have their power sources turned on for a long time has been known. In a case in which such a power save mode is applied to a cordless telephone system, for example, in a case in which there is no intention to use the cordless telephone system such as a case in which there is no plan to receive a call for a while, it is possible for a user to set the main device in a power save mode to reduce its power consumption.

In a power save mode, various types of functions of the main device may be stopped in order to save its power consumption. However, because considerable electric power is consumed in order to periodically transmit a synchronization signal to the mobile device from the main device, the transmission of a synchronization signal may be stopped when the main device makes a transition to a power save mode.

When a link between the main device and the mobile device is cut off due to such a stoppage of a synchronization signal, the mobile device judges that the mobile device itself is out of the range of the main device, and starts searches in order to receive a synchronization signal from the main device.

This search is repeatedly conducted until a synchronization signal from the main device is received to establish a link therebetween. However, in some cases, the device may be configured to stop searches in the mobile device when a state in which the mobile device does not receive a synchronization signal from the main device continues for a predetermined time or more in order to prevent the mobile device from consuming electric power.

There has been a problem that, if the mobile device stops searches in this way, even if the main device returning from a power save mode starts transmitting a synchronization signal, the synchronization signal cannot be received at the mobile device side, to be unable to establish a link therebetween. In contrast, if the mobile device is configured not to stop searches, but always execute searches, the main device and the mobile device can securely establish a link therebetween when the main device returns. However, in such a way, electric power is rapidly consumed in the mobile device.

With respect to such problems, JP-A-11-136181 discloses a following idea. That is, in a state in which there is no call from a wireless base station, a time from when a wireless terminal station turns on its power source of a receiving unit until the wireless terminal station turns on the power source the next time is set longer.

SUMMARY

Aspects of the invention provide a main device of a cordless telephone system, which is capable of achieving a sufficient electric power saving effect and restraining a mobile device from stopping searches.

BRIEF DESCRIPTION OF THE DRAWINGS

FIG. 2 is a block diagram showing the electrical configurations of the MFP and the mobile device;

FIG. 3A is a timing chart showing operation timings of the mobile device, and FIG. 3B is a timing chart showing operation timings of the MFP and the mobile device registered with the MFP;

FIG. 5A is a timing chart showing operation timings of a mobile device according to the second exemplary embodiment, and FIG. 5B is a timing chart showing operation timings of an MFP according to the second exemplary embodiment and a mobile device registered with the MFP;

FIG. 8 is a diagram showing an example of a configuration of the test cycle memory;

FIG. 17 is a timing chart showing operation timings of the MFP according to the fourth exemplary embodiment and the mobile devices registered with the MFP.

DETAILED DESCRIPTION

General Overview

Figure 1:
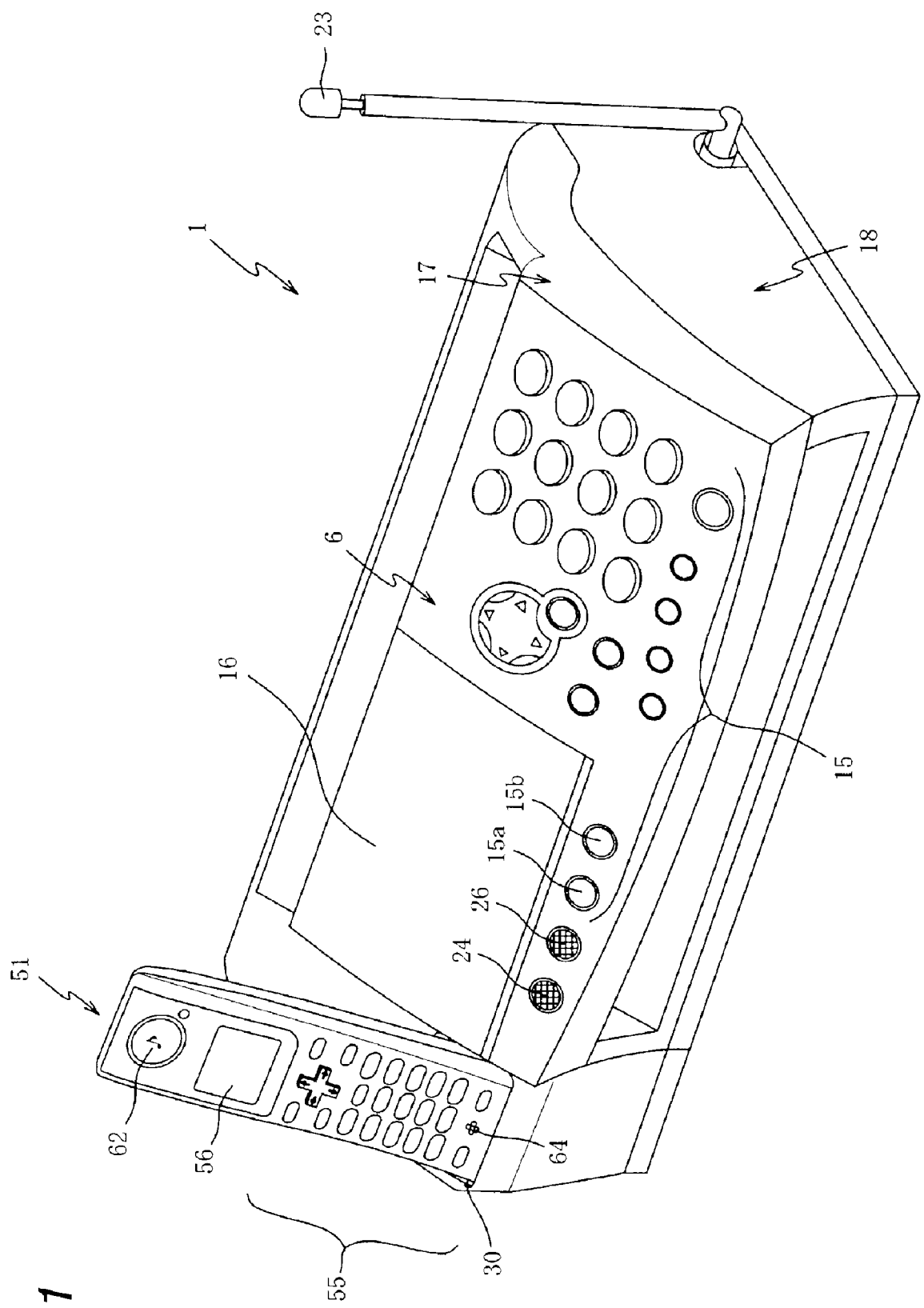
FIG. 1 is a perspective view illustrating the external configuration of an MFP and a mobile device according to an exemplary embodiment of the invention.

The related art described above has some disadvantages. For example, in the idea disclosed in JP-A-11-136181, a certain level of electric power saving effect can be achieved by reducing the number of searches by the mobile device (the wireless terminal station). However, when the search itself is continued, there has been a problem that there is room for improvement in the point of reduction in power consumption.

Aspects of the invention provide a main device of a cordless telephone system, which is capable of achieving a sufficient electric power saving effect and restraining a mobile device from stopping searches.

According to a first aspect of the invention, there is provided a main device of a cordless telephone system that performs communication with at least one additional device, each of the at least one additional device comprising: a search unit that intermittently searches for a radio wave generated from the main device; and a search stopping unit that stops execution of the search unit after a state in which the search unit does not receive a radio wave continues for a predetermined time, the main device comprising: a radio wave generating unit that generates the radio wave; an operation stopping unit that stops an operation of the radio wave generating unit; and a temporary returning unit that temporality recovers the operation of the radio wave generating unit to generate a radio wave and stops the operation of the radio wave generating unit after the at least one additional device executes multiple searches by using the search unit after stopping the operation of the radio wave generating unit, but before the predetermined time elapses.

According to a second aspect of the invention, in the main device of the cordless telephone system, the temporary returning unit comprises: a recovery unit that recovers the operation of the radio wave generating unit; a judging unit that judges whether or not communication with the at least one additional device is established after the recovery of the operation by the recovery unit; and a re-stop unit that stops the operation of the radio wave generating unit under a condition that the judging unit judges that communication with all of the at least one additional device is established.

According to a third aspect of the invention, in the main device of the cordless telephone system, the search unit is configured to execute searches a predetermined number of times within the predetermined time, and the temporary returning unit is configured to temporarily recover the operation of the radio wave generating unit to generate a radio wave while the at least one additional device executes a search corresponding to the predetermined number-th search, which is counted from the stoppage of the operation of the radio wave generating unit by the operation stopping unit or the re-stop unit, by using the search unit.

According to a fourth aspect of the invention, the main device of the cordless telephone system further comprises: a cycle determining unit that determines a recovery cycle corresponding to the predetermined time, wherein the temporary returning unit is configured to recover the operation of the radio wave generating unit in the recovery cycle determined by the cycle determining unit.

According to a fifth aspect of the invention, the main device of the cordless telephone system further comprises: an additional device model type identifying unit that identifies model types of the at least one additional device, wherein the cycle determining unit determines a cycle shorter than a shortest time among predetermined times corresponding to the at least one additional device as the recovery cycle when the additional device model type identifying unit identifies that all the model types of the at least one additional device are known.

According to a sixth aspect of the invention, in the main device of the cordless telephone system, the cycle determining unit comprises: a test unit that performs generation of a radio wave by the radio wave generating unit every predetermined test cycle; an additional device response judging unit that judges whether or not communication with the at least one additional devices is established every time the radio wave generating unit generates a radio wave; and an extension unit that extends the test cycle when the additional device response judging unit judges that communication with all of the at least one additional device is established, wherein the cycle determining unit determines a cycle shorter than a test cycle when the additional device response judging unit judges that there is no response from at least one of the at least one additional device, as the recovery cycle.

According to a seventh aspect of the invention, the main device of the cordless telephone system further comprises: an extension limiting unit that limits extension of the test cycle by the extension unit up to a predetermined upper limit, wherein the cycle determining unit determines the predetermined upper limit as the recovery cycle when the test cycle reaches the predetermined upper limit limited by the extension limiting unit and the additional device response judging unit judges that the communication with all of the at least one additional device is established.

According to an eighth aspect of the invention, the main device of the cordless telephone system further comprises: an additional device model type identifying unit that identifies model types of the at least one additional device; and an upper limit setting unit that sets a cycle shorter than a shortest time among predetermined times corresponding to the at least one additional device as the recovery cycle when the additional device model type identifying unit identifies that at least one of the at least one additional device is known.

According to a ninth aspect of the invention, the main device of the cordless telephone system further comprises: a message outputting unit that outputs a message, wherein, when the recovery cycle is determined by the cycle determining unit, the message outputting unit outputs the message that instructs to cancel an operation of the search stopping unit of the additional device which is judged that communication therewith is not established by the additional device response judging unit.

According to a tenth aspect of the invention, in the main device of the cordless telephone system, the message output by the message outputting unit is a message that instructs to temporarily remove a battery of a corresponding additional device.

According to an eleventh aspect of the invention, the main device of the cordless telephone system further comprises: a recovery cycle memory, to which a recovery cycle corresponding to the predetermined time is set, wherein the recovery cycle is set to a cycle shorter than a shortest time among predetermined times corresponding to the at least one additional device.

According to a twelfth aspect of the invention, there is provided a cordless telephone system comprising: a main device comprising: a radio wave generating unit that generates a radio wave; and an operation stopping unit that stops an operation of the radio wave generating unit; and an additional device that is connectable with the main device via a wireless communication, the additional device comprising: a search unit that intermittently searches for the radio wave generated from the main device; and a search stopping unit that stops execution of the search unit after a state in which the search unit does not receive a radio wave continues for a predetermined time, wherein the main device further comprises: a temporary returning unit that temporality recovers the operation of the radio wave generating unit to generate a radio wave and stops the operation of the radio wave generating unit after the at least one additional device executes multiple searches by using the search unit after stopping the operation of the radio wave generating unit, but before the predetermined time elapses.

According to the aspects of the invention, the main device of the cordless telephone system makes the operation of the radio wave generating unit temporarily recover to generate a radio wave, after one or more devices execute multiple searches after stopping the operation of the radio wave generating unit, but before the predetermined time elapses. Therefore, the mobile device having the search unit for intermittently searching for a radio wave generated from the main device continues to be incapable of receiving a radio wave from the main device for a while. However, the radio wave generating unit is made to temporarily recover to generate a radio wave by the main device after executing multiple searches but before the predetermined time elapses, which brings an effect of restraining the mobile device from stopping searches by receiving the radio wave.

Further, after the operation of the radio wave generating unit is made to temporarily recover by the temporary returning unit, the operation of the radio wave generating unit is stopped again, which brings an effect of achieving a sufficient electric power saving effect in the main device.

Incidentally, the one or more mobile devices may be one mobile device or a plurality of mobile devices to perform communication with the main device of the cordless telephone system.

Here, the operation stopping unit may be configured to stop the operation of the radio wave generating unit when the main device operates in a power save mode. In this way, when the main device operates in a power save mode, the main device is capable of achieving a sufficient electric power saving effect.

Further, the main device of the cordless telephone system may include an operation re-start unit for completing the stoppage of the operation of the radio wave generating unit to re-start the operation of the radio wave generating unit under a condition that the power save mode is canceled. When the power save mode is canceled, the radio wave generating unit of the main device starts generating a radio wave. However, because the mobile device does not stop searches, the mobile device is capable of receiving a radio wave from the main device, which brings an effect that the main device and the mobile device immediately establish communication therebetween.

According to the second aspect of the invention, the main device of the cordless telephone system has not only the effects achieved by the main device of the cordless telephone system according to the first aspect, but also an effect that all the mobile devices are securely restrained from stopping searches because the operation of the radio wave generating unit is stopped under a condition that it is judged that communications with all the one or more mobile devices are established after the recovery of the operation by the recovery unit.

According to the third aspect of the invention, the main device of the cordless telephone system achieves an effect which is the same as the effect achieved by the main device of the cordless telephone system according to the second aspect. Moreover, the temporary returning unit makes the operation of the radio wave generating unit temporarily recover to generate a radio wave while the one or more mobile devices execute a search corresponding to the predetermined numberth search, which is counted from the stoppage of the operation of the radio wave generating unit by the operation stopping unit or the re-stop unit, i.e., a final search executed within the predetermined time. Therefore, because the operation of the radio wave generating unit can be made to recover immediately before the mobile device stops searches, which reduces a frequency in which the operation of the radio wave generating unit is made to recover, the main device has an effect of achieving a further electric power saving effect.

Further, because the operation of the radio wave generating unit is stopped immediately after communications with all the mobile devices are established, a time of the operation of the radio wave generating unit can be shortened, the main device has an effect of achieving a further electric power saving effect.

According to the fourth aspect of the invention, the main device of the cordless telephone system has not only the effect achieved by the main device of the cordless telephone system according to the second aspect, but also has an effect that the operation of the radio wave generating unit can be made to return in an appropriate timing corresponding to the predetermined time until the mobile device stops searches because the main device includes a cycle determining unit for determining a recovery cycle corresponding to the predetermined time, and the temporary returning unit makes the operation of the radio wave generating unit recover in the recovery cycle determined by the cycle determining unit.

According to the fifth aspect of the invention, the main device of the cordless telephone system has not only the effect achieved by the main device of the cordless telephone system according to the fourth aspect, but also an effect that an appropriate recovery cycle in which all the mobile devices can be restrained from stopping searches is determined by simple processing because the cycle determining unit determines a cycle shorter than a shortest time among predetermined times corresponding to the one or more mobile devices whose model types are identified as known, as the recovery cycle, when the mobile device model type identifying unit identifies that all the model types of the one or more mobile devices are known.

According to the sixth aspect of the invention, the main device of the cordless telephone system achieves an effect which is the same as the effect by the main device of the cordless telephone system according to the fourth or fifth aspect. Further, a radio wave is generated every predetermined test cycle by the radio wave generating unit. Then, every time the radio wave generating unit generates a radio wave, it is judged that communications with the one or more mobile devices are established, and when it is judged that communications with all the one or more mobile devices are established, the test cycle is extended. Then, a cycle shorter than a test cycle when it is judged that there is no response from at least one of the one or more mobile devices is determined as a recovery cycle. Therefore, the main device has an effect that an appropriate recovery cycle in which all the mobile devices can be securely restrained from stopping searches can be determined.

Here, the cycle determining unit may be configured to set a cycle which is shorter than a test cycle when it is judged that there is no response from at least one of the one or more mobile devices by the mobile device response judging unit, and which is greater than or equal to a test cycle set one before the test cycle, as a recovery cycle. In this way, all the mobile devices can be securely restrained from stopping searches, and a recovery cycle as long as possible can be determined, which makes the main device achieve a higher electric power saving effect.

According to the seventh aspect of the invention, the main device of the cordless telephone system has not only the effect achieved by the main device of the cordless telephone system according to the sixth aspect, but also an effect that a recovery cycle can be determined in a short time because the cycle determining unit determines the predetermined upper limit as the recovery cycle when the test cycle reaches the predetermined upper limit limited by the extension limiting unit, and the mobile device response judging unit judges that communications with all the one or more mobile devices are established.

According to the eighth aspect of the invention, the main device of the cordless telephone system achieves an effect which is the same as the effect by the main device of the cordless telephone system according to the seventh aspect. Moreover, when the mobile device model type identifying unit identifies that a model type of at least one of the one or more mobile devices is known, because a cycle shorter than a shortest time among predetermined times corresponding to the mobile devices is set as the predetermined upper limit, and a test cycle is not extended more than the upper limit, there is a high possibility that a recovery cycle may be determined before the mobile devices stop searches. Therefore, the main device has an effect that a recovery cycle can be determined in a short time, and the need for making a user carry out a troublesome operation to reset a mobile device which once stops searches, can be reduced.

According to the ninth aspect of the invention, the main device of the cordless telephone system has not only the effect achieved by the main device of the cordless telephone system according to any one of the sixth to eighth aspects, but also an effect that it is possible for the user to notice that searches of the mobile devices are stopped for determining a recovery cycle, to take an appropriate measure because, when a recovery cycle is determined by the cycle determining unit, a message that instructs to cancel a stoppage of searches of a mobile device which is judged that communication therewith is not established by the mobile device response judging unit, is output.

According to the tenth aspect of the invention, the main device of the cordless telephone system has not only the effect achieved by the main device of the cordless telephone system according to the ninth aspect, but also an effect that a user can be made to know a method for securely canceling a stoppage of searches even in a case in which a mobile device by a manufacturer different from that of the main device is used, and a method for canceling a stoppage of searches is unclear, because the message output by the message outputting unit is a message that instructs to temporarily remove a battery of a corresponding mobile device.

Exemplary Embodiments

Exemplary embodiments of the invention will now be described with reference to the accompanying drawings.

First Exemplary Embodiment

FIG. 1 is a perspective view illustrating the external configuration of a multi function peripheral (MFP) 1 which is a main device of a cordless telephone system according to a first exemplary embodiment of the invention and a mobile device 51. The digital cordless telephone system composed of the MFP 1 and the mobile device 51 corresponds to a cordless telephone system described in the aspects of the invention.

The MFP 1 and the mobile device 51 are configured to be capable of communicating via a wireless communication 300 (refer to FIG. 2). The MFP 1 is operable in a normal mode in which the MFP 1 and the mobile device 51 operate so as to be capable of communicating via the wireless communication 300, or in a power save mode in which electric power consumption of the MFP 1 can be reduced.

In the first exemplary embodiment, when the MFP 1 operates in a power save mode, the MFP 1 shuts off the electric power supplied to a wireless communication control circuit 22 (one example of a radio wave generating unit) (refer to FIG. 2). Therefore, power consumption can be held down more than a case in which the wireless communication 300 is merely prohibited (stopped) in a state in which the wireless communication control circuit 22 is continued to operate.

When the electric power supplied to the wireless communication control circuit 22 is shut off, it is impossible to perform the wireless communication 300. However, the MFP 1 in the first exemplary embodiment is configured to not only achieve a sufficient electric power saving effect, but also restrain its mobile device from stopping searches. The details will be described later.

First, the MFP 1 (main device) will be described. The MFP 1 has various types of functions such as a telephone function, a facsimile function, a printer function, a scanner function, and a copy function, that is connected to a telephone line network 100 (refer to FIG. 2) in order to perform a telephone call by its telephone function or data transmission by its facsimile function. A scanner 17 to read a manuscript at the time of executing its facsimile function, scanner function, or copy function is disposed in the upper portion of the MFP 1.

A printer 18 composed of a so-called inkjet printer is built in the inside of a cartridge housing of the MFP 1 as a device printing an image on a recording sheet. The printer 18 has a print head using four color inks of C (cyan), M (magenta), Y (yellow), and K (black) and a sheet feeder, to perform color printing.

An operation panel 6 is provided to the top surface of the MFP 1, which has an operation key 15, an LCD 16, a speaker 24, and a microphone 26. Various types of buttons such as a power save mode transition button 15a and a normal mode transition button 15b are provided in the operation key 15.

In a case in which the MFP 1 operates in a normal mode, when the power save mode transition button 15a is pressed down by a user, a power save mode is set, and the MFP 1 makes a transition to a power save mode. Further, in a case in which the MFP 1 operates in a power save mode, when the normal mode transition button 15b is pressed down by the user, the setting of a power save mode is canceled, and the MFP 1 makes a transition to a normal mode.

Further, it is possible for the user to utilize the scanner function or the copy function of the MFP 1 by operating the various types of keys provided in the operation key 15. The LCD 16 displays an operation procedure or a state of processing in execution thereon, and displays information indicating an operation method and the like thereon.

The speaker 24 is to convert an input electric signal into sound to make a sound, and makes a warning sound at the time of generating an error or a ringing tone in accordance with a call-in from an external device (not shown) via the telephone line network 100 (refer to FIG. 2).

The microphone 26 is to convert an input sound into a sound signal to output the sound signal. When the MFP 1 is connected so as to be capable of a telephone call with an external device (not shown) via the telephone line network 100 (refer to FIG. 2), a voice made from the user is converted into a sound signal by the microphone 26 to be transmitted to the external device via the telephone line network 100.

A mobile device charging stand 30 on which the mobile device 51 can be mounted is integrally provided on the left side of the operation panel 6. When the mobile device 51 is mounted on the mobile device charging stand 30, a rechargeable battery 57 (refer to FIG. 2) of the mobile device 51 is charged.

Next, the mobile device 51 will be described. An operation key 55 and an LCD 56 are provided on the front face of the mobile device 51. Various types of buttons such as numeric buttons for inputting a telephone number are provided for the operation key 55. The LCD 56 displays an operation procedure, a state of a telephone call, or the like of the mobile device 51 thereon. A speaker 62 is provided at the upper side of the LCD 56. The speaker 62 makes a warning sound, a ringing tone, or the like in the same way as the speaker 24 of the MFP 1.

A microphone 64 is provided at the lower side of the front face of the mobile device 51. The microphone 64 is to convert an input sound into a sound signal to output the sound signal. When the MFP 1 is connected so as to be capable of a telephone call with an external device (not shown) via the telephone line network 100 (refer to FIG. 2), it is possible for the user to perform a telephone call with the external device by using the mobile device 51. For example, a voice made from the user is converted into a sound signal by the microphone 64 to be transmitted to the external device via the wireless communication 300 and the telephone line network 100.

Next, the electrical configurations of the MFP 1 (main device) and the mobile device 51 will be described with reference to FIG. 2.

FIG. 2 is a block diagram showing the electrical configurations of the MFP 1 and the mobile device 51. First, the MFP 1 will be described. The MFP 1 mainly has a CPU 11, a ROM 12, a RAM 13, a flash memory 14, the operation key 15, the LCD 16, the scanner 17, the printer 18, a timer circuit 19, an electric power supply circuit 20, a switch 21, the wireless communication control circuit 22, the speaker 24, the microphone 26, an NCU 28, a modem 29, and a mobile device charging stand 30.

The CPU 11, the ROM 12, the RAM 13, and the flash memory 14 are connected to one another via a bus line 31. Further, the operation key 15, the LCD 16, the scanner 17, the printer 18, the timer circuit 19, the switch 21, the wireless communication control circuit 22, the speaker 24, the microphone 26, the NCU 28, the modem 29, and the bus line 31 are connected to one another via an input/output port 32.

The CPU 11 is to control the respective functions which the MFP 1 has, or control the respective parts connected to the input/output port 32 in accordance with fixed values and programs to be stored in the ROM 12, the RAM 13, and the flash memory 14, or various types of signals to be transmitted and received via the NCU 28 or the wireless communication control circuit 22.

Figure 4:
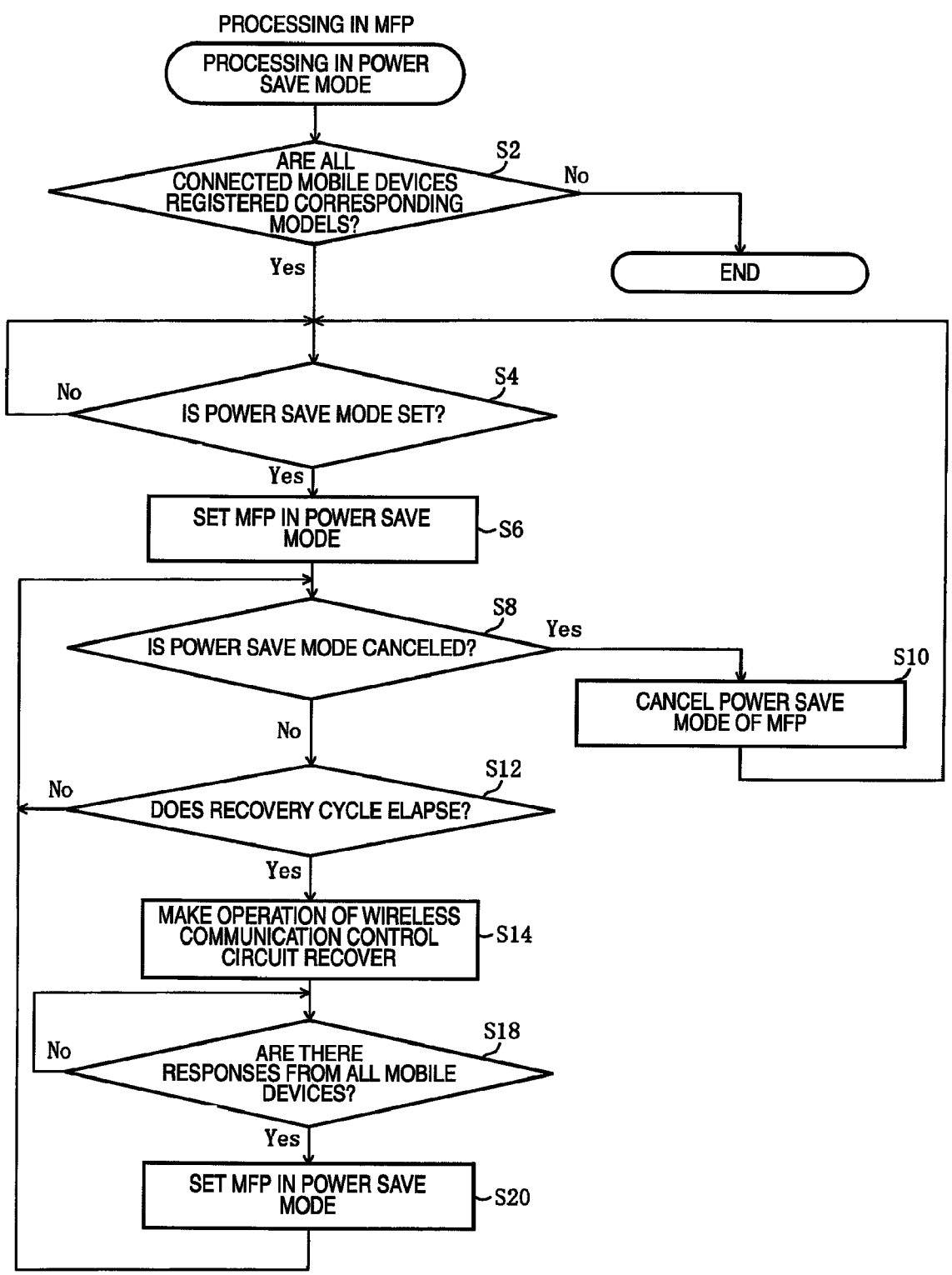
FIG. 4 is a flowchart showing processing in a power save mode executed in the MFP according to the first exemplary embodiment.

The ROM 12 is a read-only memory storing a control program executed in MFP 1 and the like therein. The respective programs for executing processing in a power save mode shown in a flowchart of FIG. 4 are stored in the ROM 12. Further, a corresponding model information memory 12a is provided in the ROM 12. The corresponding model information memory 12a is a memory storing a model of a mobile device corresponding to the processing in a power save mode (refer to FIG. 4) which will be described later and a time-out period corresponding to the model therein. Incidentally, the time-out period will be described later with reference to FIGS. 3A and 3B.

The RAM 13 is a rewritable volatile memory, that is, a memory for temporarily storing various types of data at the time of executing the respective operations of the MFP 1. The flash memory 14 is a rewritable nonvolatile memory, and data stored in the flash memory 14 is kept even after the power source of the MFP 1 is turned off. A recovery cycle memory 14a and a use mobile device registering memory 14b are provided in the flash memory 14.

The recovery cycle memory 14a is a memory setting a recovery cycle therein. When the MFP 1 operates in a power save mode, the MFP 1 shuts off the electric power supplied to the wireless communication control circuit 22. However, the MFP 1 supplies electric power to the wireless communication control circuit 22, to make the wireless communication control circuit 22 temporarily recover every recovery cycle set in the recovery cycle memory 14a. The recovery cycle will be described later in detail with reference to FIGS. 3A and 3B. Incidentally, the first exemplary embodiment will be described on the assumption that a recovery cycle to be set in the recovery cycle memory 14a is set in advance in the MFP 1.

The use mobile device registering memory 14b is a memory with which a mobile device ID for identifying a mobile device making a telephone call with the MFP 1, or a model type denoting whether or not the mobile device is a known model stored in the corresponding model information memory 12a is registered. Hereinafter, this mobile device whose information is registered with the use mobile device registering memory 14b is called a "registered mobile device." Incidentally, the first exemplary embodiment will be described on the assumption that only the information on the mobile device 51 is registered with the use mobile device registering memory 14b. However, information on a plurality ofity of the mobile devices 51 may be registered with the use mobile device registering memory 14b.

The timer circuit 19 has a clock function which counts a current date and time, and is a known circuit which clocks a standby time for which the MFP 1 waits for a key input or a call-in from an external device (not shown).

The electric power supply circuit 20 is a power source circuit to supply electric power required for making the wireless communication control circuit 22 operate. The switch 21 is to supply or shut off the electric power supplied from the electric power supply circuit 20 to the wireless communication control circuit 22 in accordance with a signal input from the CPU 11. For example, when the MFP 1 operates in a normal mode, when a high signal is input thereto from the CPU 11, the switch 21 is turned on to supply electric power from the electric power supply circuit 20 to the wireless communication control circuit 22. In contrast, when the MFP 1 operates a power save mode, a low signal is input thereto from the CPU 11, the switch 21 is turned off to shut off the electric power supplied from the electric power supply circuit 20 to the wireless communication control circuit 22, and the MFP 1 stops the operation.

The wireless communication control circuit 22 has a wireless communication antenna 23. The wireless communication control circuit 22 is a known circuit that performs the wireless communication 300 with the wireless communication control circuit 60 of the mobile device 51, to be capable of data transmission or transmission and reception of a sound signal and the like with the mobile device 51. When the MFP 1 operates in a normal mode, the wireless communication control circuit 22 periodically generates a synchronization signal (one example of a radio wave described in the aspects of the invention). Then, the mobile device 51 is synchronized with the MFP 1 on the basis of the synchronization signal to keep the MFP 1 and the mobile device 51 capable of communicating therebetween.

In contrast, when the MFP 1 makes a transition from a normal mode to a power save mode, the electric power supplied from the electric power supply circuit 20 to the wireless communication control circuit 22 is shut off, not to transmit a synchronization signal from the wireless communication control circuit 22, which shuts off the communication between the MFP 1 and the mobile device 51.

The NCU 28 is connected to the telephone line network 100, to control a transmission of a dial signal to the telephone line network 100, a response to a ringing signal from the telephone line network 100, and the like. The modem 29 is to modulate image data instructed to transmit by the facsimile function into a signal which can be transmitted to the telephone line network 100, to transmit the signal via the NCU 28, or to receive a signal input from the telephone line network 100 via the NCU 28, to demodulate the signal into image data which can be displayed on the LCD 16 or recorded by the printer 18.

Next, the electrical configuration of the mobile device 51 will be described. The mobile device 51 mainly has a CPU 52, a ROM 53, a RAM 54, the operation key 55, the LCD 56, the rechargeable battery 57, the wireless communication control circuit 60, the speaker 62, and the microphone 64. The CPU 52 is one example of a search unit and a search stopping unit.

The CPU 52, the ROM 53, the RAM 54, the operation key 55, the LCD 56, the rechargeable battery 57, the wireless communication control circuit 60, the speaker 62, and the microphone 64 are connected to one another via a bus line 66.

The CPU 52 is to control the respective parts connected to one another via the bus line 66 in accordance with fixed values and programs stored in the ROM 53 and the RAM 54, or various types of signals transmitted and received via the wireless communication control circuit 60. The ROM 53 is a read-only memory storing various types of control programs executed in the mobile device 51 therein.

As described above, while the MFP 1 operates in a power save mode, when the MFP 1 and the mobile device 51 become incapable of communicating with each other, the CPU 52 once stops the operation of the wireless communication control circuit 60 in accordance with a program stored in the ROM 53. Thereafter, the CPU 52 intermittently operates the wireless communication control circuit 60. Thereby, the mobile device 51 is capable of intermittently searching for a synchronization signal generated from the MFP 1. Further, when a state in which a synchronization signal is not received by the searches continues, the CPU 52 stops the operation of the wireless communication control circuit 60 to stop executing searches. However, the details will be described later with reference to FIG. 3A.

The RAM 54 is a rewritable memory for temporarily storing various types of data therein. A search counter 54a is provided in the RAM 54. The search counter 54a is a counter indicating a time elapsed from when shutting off the communication between the MFP 1 and the mobile device 51. When a synchronization signal from the MFP 1 is not received even when a time from when shutting off the communication with the MFP 1 elapses a time-out period set in advance in the mobile device 51, the CPU 52 stops the operation of the wireless communication control circuit 60, to stop searches.

Incidentally, a time from when shutting off the communication between the MFP 1 and the mobile device 51 until searches are stopped is called a time-out period in this specification. This time-out period is a time corresponding to a "predetermined time" described in the aspects of the invention.

The rechargeable battery 57 is to store electric power supplied from the charging circuit 30b of the MFP 1. The electric power stored in the rechargeable battery 57 is supplied as operating electric power to the respective parts of the mobile device 51.

The wireless communication control circuit 60 has a wireless communication antenna 61. The wireless communication control circuit 60 is a known circuit that performs the wireless communication 300 with the wireless communication control circuit 22 of the MFP 1, and receives a synchronization signal from the MFP 1 to transmit and receive a sound signal and the like.

The operation of the MFP 1 configured as described above will be described with reference to FIGS. 3A and 3B. FIG. 3A is a timing chart showing operation timings of the mobile device 51, and FIG. 3B is a timing chart showing operation timings of the MFP 1 and the mobile device 51 registered with the MFP 1.

Incidentally, FIG. 3A is a timing chart accompanied for ease of explanation of the operation of the mobile device 51, and shows the operation timings of the mobile device 51 registered with a main device to which the invention is not applied.

As shown in FIG. 3A, for example, when the main device makes a transition to a power save mode to stop generating a synchronization signal, the mobile device 51 judges that the communication with the main device is shut off, and performs searches for a synchronization signal generated from the main device. For saving the power consumption in the mobile device 51, the mobile device 51 is to intermittently execute searches, and executes searches at search intervals set in advance. Incidentally, zones in execution of search are represented in gray in the drawings of FIGS. 3A and 3B on and after. Further, in FIG. 3A, zones in which searches are executed are denoted by symbols "S." However, if the symbols are added to all the drawings, the drawings are difficult to see. Therefore, the zones in execution of search are not particularly denoted by symbols in the following drawings.

The mobile device 51 executes, for example, thirteen searches within a time-out period shown in FIG. 3A. Then, when the mobile device 51 can receive a synchronization signal from the main device within the time-out period, the mobile device 51 is synchronized with the main device on the basis of the synchronization signal.

In contrast, as shown in FIG. 3A, when the mobile device 51 cannot receive a synchronization signal from the main device even when the time-out period elapses, the mobile device 51 stops the operation of the wireless communication control circuit 60 to stop executing the searches. Accordingly, thereafter, even if the power save mode of the MFP 1 is canceled and the MFP 1 restarts generating a synchronization signal, the mobile device 51 cannot receive the synchronization signal, which continues a state in which the mobile device 51 is unusable.

In contrast thereto, as shown in FIG. 3B, when the MFP 1 in the first exemplary embodiment operates in a power save mode, the MFP 1 makes the operation of the wireless communication control circuit 22 temporarily recover to generate a synchronization signal every recovery cycle set in the recovery cycle memory 14*a* (refer to FIG. 2), to restrain the mobile device from stopping searches. In this specification, as shown in FIG. 3B, a time from when stopping the operation of the wireless communication control circuit 22 until the operation of the wireless communication control circuit 22 is started next time is called a recovery cycle.

As shown in FIGS. 3A and 3B, at time $t_0$, for example, after stopping the operation of the wireless communication control circuit 22 of the MFP 1 and executing twelve searches (multiple searches described in the aspects of the invention) in the mobile device 51, and before the time-out period elapses (time $t_1$ in FIG. 3B), the MFP 1 makes the operation of the wireless communication control circuit 22 temporarily recover to generate a synchronization signal.

Because the mobile device 51 executes the thirteenth search during that time, the mobile device 51 can receive the synchronization signal, and judges that the communication with the MFP 1 can be established within the time-out period, not to stop searches.

Further, when the mobile device 51 judges that the communication with the MFP 1 can be established, the mobile device 51 sets a value of the search counter 54*a* (refer to FIG. 2) to "0," and transmits a response signal to the MFP 1 (refer to time $t_3$). Then, the MFP 1 which has received the response signal judges that the communication with the mobile device 51 can be established, and stops the operation of the wireless communication control circuit 22 again as shown by time $t_4$. Stopping the operation of the wireless communication control circuit 22 again in this way brings a sufficient electric power saving effect in the MFP 1.

Further, the mobile device 51 starts searches again due to the operation of the wireless communication control circuit 22 being stopped. However, because a value of the search counter 54*a* is once returned to "0" when establishing the communication, the mobile device 51 does not stop searches, but continue searches until the time-out period elapses next time.

In this way, according to the MFP 1 in the first exemplary embodiment, the MFP 1 can restrain the mobile device 51 from stopping searches. Therefore, for example, when the setting of the power save mode is canceled in the MFP 1, and the MFP 1 in a normal mode restarts the wireless communication control circuit 22, the mobile device 51 does not stop searches, and is capable of receiving a synchronization signal from the MFP 1, which allows the MFP 1 and the mobile device 51 to immediately establish communication therebetween.

Further, according to the MFP 1 in the first exemplary embodiment, a recovery cycle is set in advance and set in the recovery cycle memory 14*a* so as to make the operation of the wireless communication control circuit 22 recover during a search corresponding to the thirteenth search counted from stopping (times $t_0$ and $t_4$) of the operation of the wireless communication control circuit 22, i.e., a final search executed within the time-out period is executed in the mobile device 51. Therefore, because the operation of the wireless communication control circuit 22 is made to recover immediately before the mobile device 51 stops searches, the frequency of making the operation of the wireless communication control circuit 22 recover is decreased, which brings a further electric power saving effect.

Incidentally, in the first exemplary embodiment, for ease of explanation, the case in which the mobile device 51 is registered with the MFP 1 has been described. However, when a plurality of mobile devices are registered with the MFP 1, it is recommended that, by using a mobile device having a minimum time-out period among the time-out periods of those registered mobile devices, a recovery cycle shorter than the minimum time-out period is set in advance, and the recovery cycle is set in the recovery cycle memory 14*a*. In this way, all the registered mobile devices can be restrained from stopping searches.

Next, the operations of the MFP 1 will be described by using a flowchart with reference to FIG. 4. FIG. 4 is the flowchart showing processing in a power save mode executed in the MFP 1.

First, the MFP 1 reads a model type of the mobile device 51 registered with the MFP 1 from the use mobile device registering memory 14*b*, and judges whether or not the mobile device is a known corresponding model stored in the corresponding model information memory 12*a* (S2, one example of a mobile device model type identifying unit). When the model type of the mobile device 51 is not stored in the corresponding model information memory 12*a* (S2: No), the MFP 1 completes the processing.

In contrast, when the judgment at S2 is affirmative (S2: Yes), the MFP 1 judges whether or not a power save mode is set by pressing down the power save mode transition button 15*a* by the user (S4). When the judgment at S4 is negative (S4: No), the MFP 1 stands by for processing. However, when the judgment at S4 is affirmative (S4: Yes), the MFP 1 stops supplying electric power to the wireless communication control circuit 22 to stop the operation (S6, one example of an operation stopping unit). Thereby, the MFP 1 is set in a power save mode. Incidentally, the MFP 1 may be configured to shut off the electric power to the other functional parts other than the wireless communication control circuit 22 at the time of making a transition to a power save mode.

Next, the MFP 1 judges whether or not the power save mode is canceled based on whether or not the normal mode transition button 15*b* is pressed down by the user (S8). When the judgment at S8 is affirmative (S8: Yes), the MFP 1 starts supplying electric power to the wireless communication control circuit 22, to cancel the power save mode of the MFP 1 (S10), and the MFP 1 returns to the processing at S4.

In contrast, when the judgment at S8 is negative (S8: No), the MFP 1 judges whether or not a time from the stoppage of the operation of the wireless communication control circuit 22 reaches the recovery cycle elapses (S12). When the judgment at S12 is negative (S12: No), the MFP 1 returns to S8 to repeat the processing.

In contrast, when the judgment at S12 is affirmative (S12: Yes), the MFP 1 makes the operation of the wireless communication control circuit 22 recover (S14, one example of a recovery unit) Then, after the recovery of the operation of the wireless communication control circuit 22 by the processing at S14, the MFP 1 judges whether or not communication with the mobile device 51 is established on the basis of a response signal transmitted from the mobile device 51 at the time of establishing communication (S18, one example of a judging unit). When the judgment at S18 is negative (S18: No), the MFP 1 stands by while keeping the operation of the wireless communication control circuit 22 at recover.

In contrast, when the judgment at S18 is affirmative (S18: Yes), the MFP 1 stops supplying electric power to the wireless communication control circuit 22, to stop the operation of the wireless communication control circuit 22 (S22). That is, the MFP 1 is capable of stopping the operation of the wireless communication control circuit 22 after communication with the mobile device 51 is established.

Further, when a plurality of mobile devices are registered with the MFP 1, the MFP 1 may be configured to judge whether or not communications with all the registered mobile devices are established at S18. In this way, the MFP 1 is capable of stopping the operation of the wireless communication control circuit 22 after communications with all the registered mobile devices are established, and the MFP 1 is capable of securely restraining all the mobile devices from stopping their searches.

Then, after the processing at S20 (one example of a re-stop unit), the MFP 1 returns to S8 to repeat the processing. Then, in the processing at S20, the operation of the wireless communication control circuit 22 is made to recover every time a time from the stoppage of the operation of the wireless communication control circuit 22 elapses the recovery cycle set in advance. The processings from S8 to S20 are repeated until the user instructs to cancel the power save mode. Incidentally, S14 to S20 are one example of a temporary returning unit.

According to the MFP 1 in the first exemplary embodiment, by making the operation of the wireless communication control circuit 22 recover every recovery cycle set in advance in the recovery cycle memory 14a, the MFP 1 is capable of achieving a sufficient electric power saving effect, and restraining its mobile device from stopping searches.

Second Exemplary Embodiment

Next, a second exemplary embodiment of the invention will be described with reference to FIGS. 5 and 6. The first exemplary embodiment has been described on the assumption that the recovery cycle suitable for the time-out period of the mobile device 51 is set in advance in the recovery cycle memory 14a. In contrast thereto, the second exemplary embodiment is configured such that a user is made to input a desired setting time, and a recovery cycle is determined on the basis of the setting time.

When the common standard DECT (Digital Enhanced Cordless Telecommunications) in digital cordless telephone systems is used, communication between any main device and mobile device is possible. Therefore, a mobile device from a different manufacturer, or a mobile device having a completely different time-out period may be registered with the MFP 1 in some cases. The MFP 1 in the second exemplary embodiment is, as will be described in detail, configured to securely restrain the mobile device 51 as described above from stopping searches.

Incidentally, the second exemplary embodiment will be described on the assumption that the external configuration and the electrical configuration of the MFP 1 are the same as those of the MFP 1 in the first exemplary embodiment. Hereinafter, portions which are the same as those in the first exemplary embodiment are denoted by the same reference numerals, and descriptions thereof will be omitted. Points different from those in the first exemplary embodiment will be described.

FIG. 5A is a timing chart showing operation timings of the mobile device 51 in the second exemplary embodiment, and FIG. 5B is a timing chart showing operation timings of the MFP 1 and the mobile device 51 registered with the MFP 1 in the second exemplary embodiment.

Incidentally, FIG. 5A is a timing chart accompanied for ease of explanation of the operation of the mobile device 51, and shows the operation timings of the mobile device 51 registered with a main device to which the invention is not applied.

As shown in FIG. 5A, the mobile device 51 in the second exemplary embodiment has a time-out period of a length from time $t_{20}$ to time $t_{21}$, for example. Then, when the mobile device 51 can receive a synchronization signal from the main device within the time-out period in the same way as the mobile device 51 in the first exemplary embodiment, the mobile device 51 is synchronized with the main device on the basis of the synchronization signal. In contrast, when the mobile device 51 cannot receive any synchronization signal from the main device even after the time-out period elapses, the mobile device 51 stops executing searches.

As shown in FIG. 5B, the MFP 1 in the second exemplary embodiment is common to the MFP 1 in the first exemplary embodiment in the point that, when the MFP 1 operates in a power save mode in the same way as in the first exemplary embodiment, the MFP 1 makes the operation of the wireless communication control circuit 22 temporarily recover every recovery cycle stored in the recovery cycle memory 14a (refer to FIG. 2), to restrain the mobile device from stopping searches. The MFP 1 in the second exemplary embodiment is different from the MFP 1 in the first exemplary embodiment in the point that a recovery cycle is determined on the basis of a setting time input by the user.

A recovery cycle to be determined in the MFP 1 in the second exemplary embodiment will be described with reference to FIG. 5B. As shown in FIG. 5B, a recovery cycle is determined by subtracting an ON-maximum time OT from a setting time ST input by the user.

As a setting time ST, the user is made to input a time shorter than the time-out period of the mobile device 51. Incidentally, when a plurality of mobile devices are registered with the MFP 1, the user is made to input a time shorter than a minimum time-out period among the time-out periods of those registered mobile devices.

The ON-maximum time OT is a value stored in advance in the ROM 12 of MFP 1, and is a fixed value which is set in advance so as to be longer than a maximum value as a searching interval of the mobile device (i.e., an interval from when one search is completed until the following search is started), to be stored in the ROM 12. The second exemplary embodiment will be described on the assumption that a maximum value as a searching interval of the mobile device shown in the second exemplary embodiment is 10 minutes. A maximum value as a searching interval of the mobile device variously differs depending on a model of the mobile device. However, a sufficiently great value is set in advance as the ON-maximum time OT. The second exemplary embodiment will be described on the assumption that the ON-maximum time OT is 15 minutes.

The recovery cycle determined in this way is set in the recovery cycle memory 14a. Then, when the MFP 1 operates in a power save mode, the MFP 1 makes the wireless communication control circuit 22 operate every set recovery cycle. As a result, in the same way as in the first exemplary embodiment, in the MFP 1 in the second exemplary embodiment as well, communication between the main device and the mobile device is established before reaching the time-out period of the mobile device 51, which does not stop the mobile device from searches.

As described in the first exemplary embodiment, when the mobile device 51 judges that communication with the MFP 1 can be established, the mobile device 51 sets a value of the search counter 54a (refer to FIG. 2) to "0," and transmits a response signal to the MFP 1.

The MFP 1 is configured to continue the operation of the wireless communication control circuit 22 during the elapse of the ON-maximum time OT from the operation of the wireless communication control circuit 22 when the MFP 1 does not receive a response signal. However, as described above, because the ON-maximum time OT is set to be longer than a searching interval, during the ON-maximum time OT, the mobile device 51 executes at least one search, communication between the MFP 1 and the mobile device 51 is established by the search, and the mobile device 51 transmits a response signal to the MFP 1.

When the MFP 1 receives a response signal from the mobile device 51 before the ON-maximum time OT elapses, the MFP 1 judges that communication with mobile device 51 can be established, and stops the operation of the wireless communication control circuit 22 in a time shorter than the ON-maximum time OT as shown by time $t_{13}$. Therefore, the MFP 1 is capable of achieving a higher power consumption saving effect.

Next, the operation of the MFP 1 in the second exemplary embodiment will be described by using a flowchart with reference to FIG. 6. FIG. 6 is the flowchart showing processing in a power save mode executed in the MFP 1 in the second exemplary embodiment. As shown in FIG. 6, the processing in a power save mode is different from the processing in a power save mode in the first exemplary embodiment (refer to FIG. 4) in the point that the processing at S2 is not provided and processings at S62, S63, S64, and S66 are added. Incidentally, S66 is one example of a cycle determining unit. In the flowchart shown in FIG. 6, portions which are the same as those in the flowchart shown in FIG. 4 are denoted by the common reference numerals, and descriptions thereof will be omitted.

Figure 6:
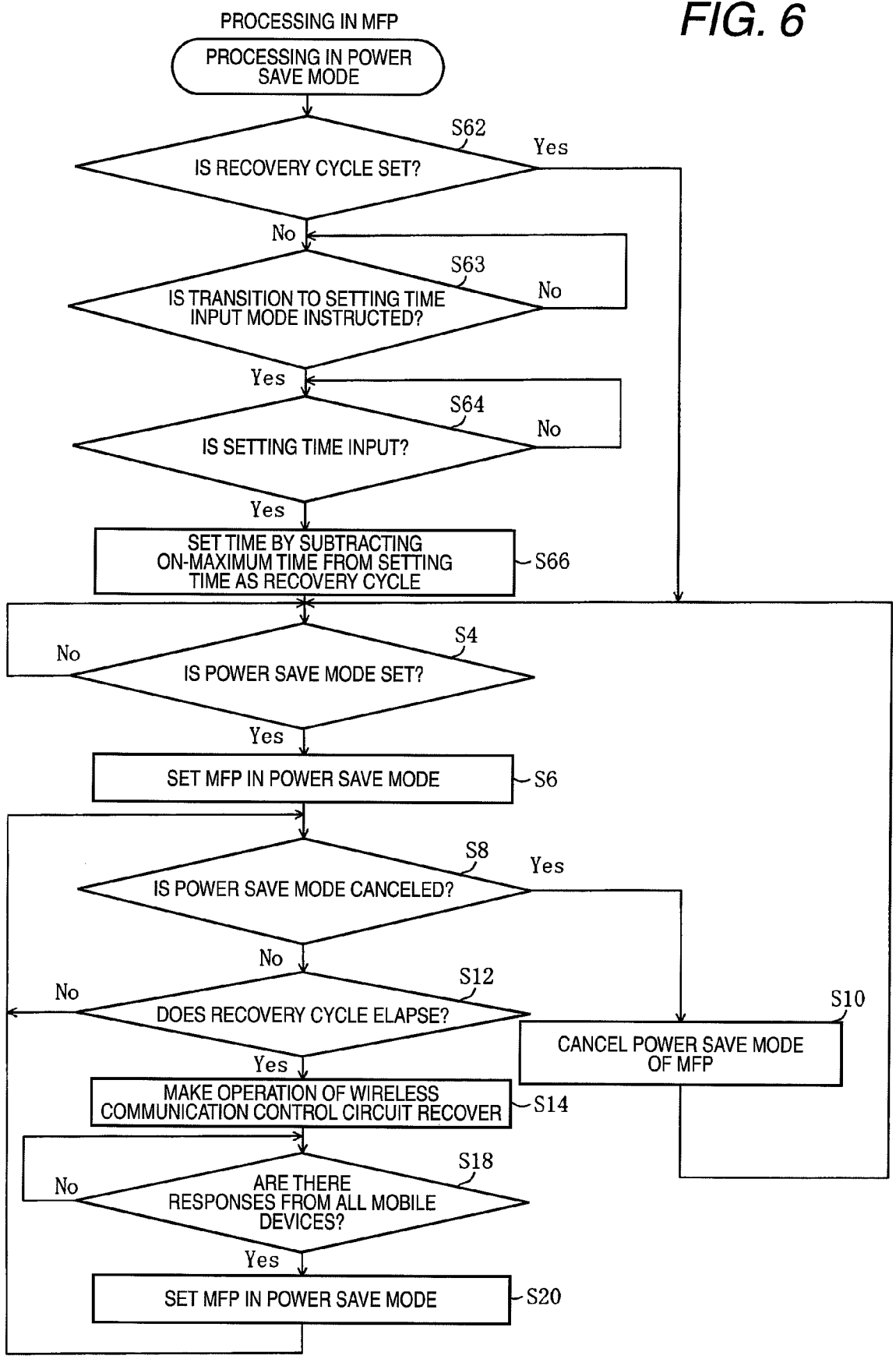
FIG. 6 is a flowchart showing processing in a power save mode executed in the MFP according to the second exemplary embodiment.

As shown in FIG. 6, in the processing in a power save mode in the second exemplary embodiment, first, the MFP 1 judges whether or not a recovery cycle is set in the recovery cycle memory 14a (S62). When the judgment at S62 is affirmative (S62: Yes), the MFP 1 proceeds to the processing at S4, and executes the same processing described in the first exemplary embodiment.

In contrast, when the judgment at S62 is negative (S62: No), the MFP 1 judges whether or not the MFP 1 is instructed to make a transition to a setting time input mode by the user (S63). The user is capable of instructing a transition to a setting time input mode by performing a predetermined operation by the operation key 15 of the MFP 1.

When the judgment at S63 is negative (S63: No), the MFP 1 stands by for processing. In contrast, when the judgment at S63 is affirmative (S63: Yes), the MFP 1 judges whether or not a setting time ST is input by the user (S64). When the judgment at S64 is negative (S64: No), the MFP 1 stands by for processing. However, when the judgment at S64 is affirmative (S64: Yes), the MFP 1 determines a value obtained by subtracting the ON-maximum time OT from the setting time ST as a recovery cycle, to set the value in the recovery cycle memory 14a (S66).

That is, the user is made to input a setting time shorter than the time-out period, and the MFP 1 is capable of determining a recovery cycle corresponding to the time-out period of the mobile device 51 on the basis of the input setting time.

Then, the MFP 1 proceeds to the processing at S4, and when the MFP 1 is instructed to make a transition to a power save mode, the MFP 1 stops the operation of the wireless communication control circuit 22, and makes the operation temporarily recover every determined recovery cycle.

According to the MFP 1 in the second exemplary embodiment, the operation of the wireless communication control circuit 22 can be made to return in an appropriate timing corresponding to the time-out period of the mobile device 51.

Incidentally, in the MFP 1 in the second exemplary embodiment, in some cases, the time-out period of the mobile device 51 may be stored in advance in, for example, the corresponding model information memory 12a (refer to FIG. 2), or the MFP 1 may be configured to be connectable to the Internet, to be capable of acquiring the time-out period of the mobile device 51 via the Internet. In such a case, the MFP 1 may be configured to automatically determine a setting time shorter than the time-out period, and to determine a recovery cycle by subtracting the ON-maximum time from the setting time.

Third Exemplary Embodiment

A third exemplary embodiment of the invention will be described with reference to FIGS. 7 to 12. The second exemplary embodiment has been described on the assumption that the user is made to input the setting time shorter than the time-out period of the mobile device 51 to determine a recovery cycle. In contrast thereto, the third exemplary embodiment is configured such that an appropriate recovery cycle can be set even if the user does not know the time-out period.

Incidentally, the third exemplary embodiment will be described on the assumption that the external configuration and the electrical configuration of the MFP 1 are the same as those of the MFP 1 in the first exemplary embodiment. Hereinafter, portions which are the same as those in the first exemplary embodiment are denoted by the same reference numerals, and descriptions thereof will be omitted. Points different from those in the first exemplary embodiment will be described. Further, for ease of explanation, the third exemplary embodiment will be described on the assumption that only the mobile device 51 is registered with the MFP 1. However, the invention can be applied to a case in which a plurality of mobile devices are registered with the MFP 1. In a case in which a plurality of mobile devices are registered with the MFP 1, descriptions of portions necessary in particular are added.

Figure 7:
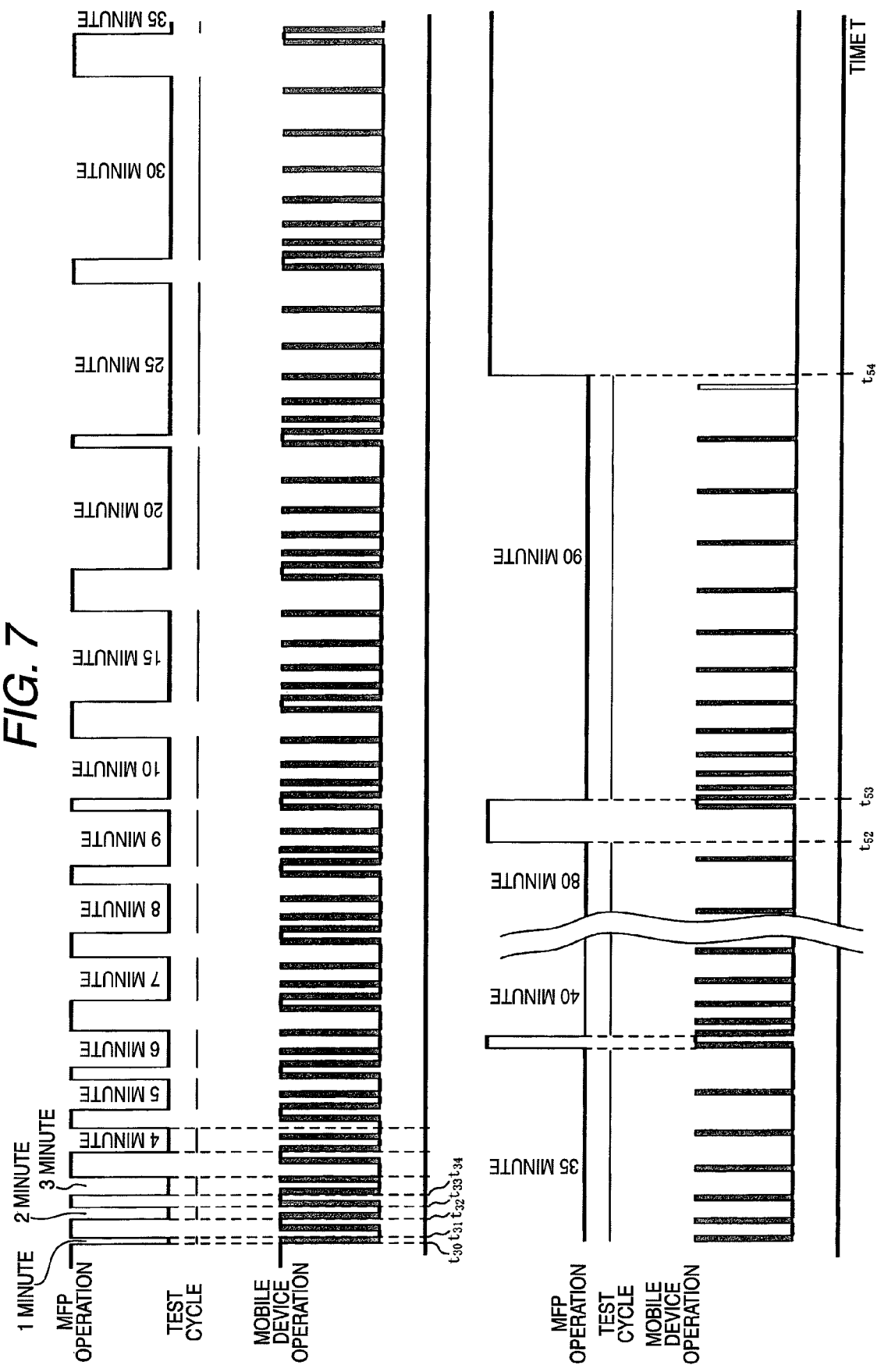
FIG. 7 is a timing chart showing operation timings of the MFP and a mobile device during execution of compatibility verification processing to verify a time-out period of the mobile device in an MFP according to the third exemplary embodiment.

FIG. 7 is a timing chart showing operation timings of the MFP 1 and the mobile device 51 during execution of compatibility verification processing to verify a time-out period of the mobile device 51 in the MFP 1 in the third exemplary embodiment.

As shown in FIG. 7, at the time of verifying the time-out period of the mobile device 51, the MFP 1 makes the wireless communication control circuit 22 operate every test cycle, to generate a synchronization signal. Then, when communication with the mobile device 51 is established by the synchronization signal, the MFP 1 extends the test cycle.

For example, the MFP 1 stops the operation of the wireless communication control circuit 22 at time $t_{30}$, and after a test cycle of one minute (time $t_{31}$), the MFP 1 makes the MFP 1 temporarily recover. Then, when communication with the mobile device 51 is established on the basis of a synchronization signal generated from the wireless communication control circuit 22, the MFP 1 stops the operation of the wireless communication control circuit 22 at time $t_{32}$.

Then, next, after a test cycle of two minutes (time $t_{33}$), the MFP 1 makes the operation of the wireless communication control circuit 22 temporarily recover. Then, when communication with the mobile device 51 is established on the basis of a synchronization signal generated from the wireless communication control circuit 22, the MFP 1 stops the operation of the wireless communication control circuit 22 at time $t_{34}$.

The MFP 1 repeats such processings until communication with the mobile device 51 cannot be established.

In FIG. 7, time $t_{52}$ is after the elapse of a test cycle of 80 minutes, showing a time when the operation of the wireless communication control circuit 22 is made to temporarily recover. In contrast thereto, because the mobile device 51 executes searches to establish communication with the MFP 1, the MFP 1 stops the operation of the wireless communication control circuit 22 at time $t_{53}$.

Next, the MFP 1 extends the test cycle of 80 minutes to make it be 90 minutes. Then, the MFP 1 makes the operation of the wireless communication control circuit 22 recover at time $t_{54}$ after the elapse of 90 minutes from time $t_{53}$. However, the mobile device 51 times out at time $t_{54}$, to stop searches. Therefore, even if the MFP 1 makes the operation of the wireless communication control circuit 22 recover, communication with the mobile device 51 is not established.

As a result, it can be identified that the time-out period of the mobile device 51 is longer than 80 minutes and shorter than 90 minutes. According to the MFP 1 in the third exemplary embodiment, a recovery cycle according to the time-out period is determined on the basis of a test cycle (80 minutes in the example shown in FIG. 7) set immediately before the time-out period. However, the details will be described with reference to FIG. 10.

Incidentally, it is assumed that an ON-maximum time for which the operation of the wireless communication control circuit 22 is continued is 5 minutes or a length of half of a test cycle set at that time (the maximum length is 20 minutes) in the compatibility verification processing executed in the MFP 1 in the third exemplary embodiment and the MFP 1 in a fourth exemplary embodiment which will be described later.

FIG. 8 is a diagram showing an example of a configuration of a test cycle memory. As shown in FIG. 8, the test cycle memory is to store values of test cycles, and is configured to be capable of reading the values in ascending order. Incidentally, the test cycle memory is stored in advance in the flash memory 14 of the MFP 1.

The MFP 1 in the third exemplary embodiment sets a value read from the test cycle memory as a test cycle, and makes the wireless communication control circuit 22 operate according to the test cycle, and judges whether or not communication is established. When communication is established, the MFP 1 reads a following value from the test cycle memory to set the value as a test cycle, and repeats the processing.

In this way, the MFP 1 is capable of extending the test cycle every time communication with the mobile device 51 is established. Incidentally, in the third exemplary embodiment, a final value corresponding to the upper limit of a test cycle is set to 500 minutes.

Figure 9:
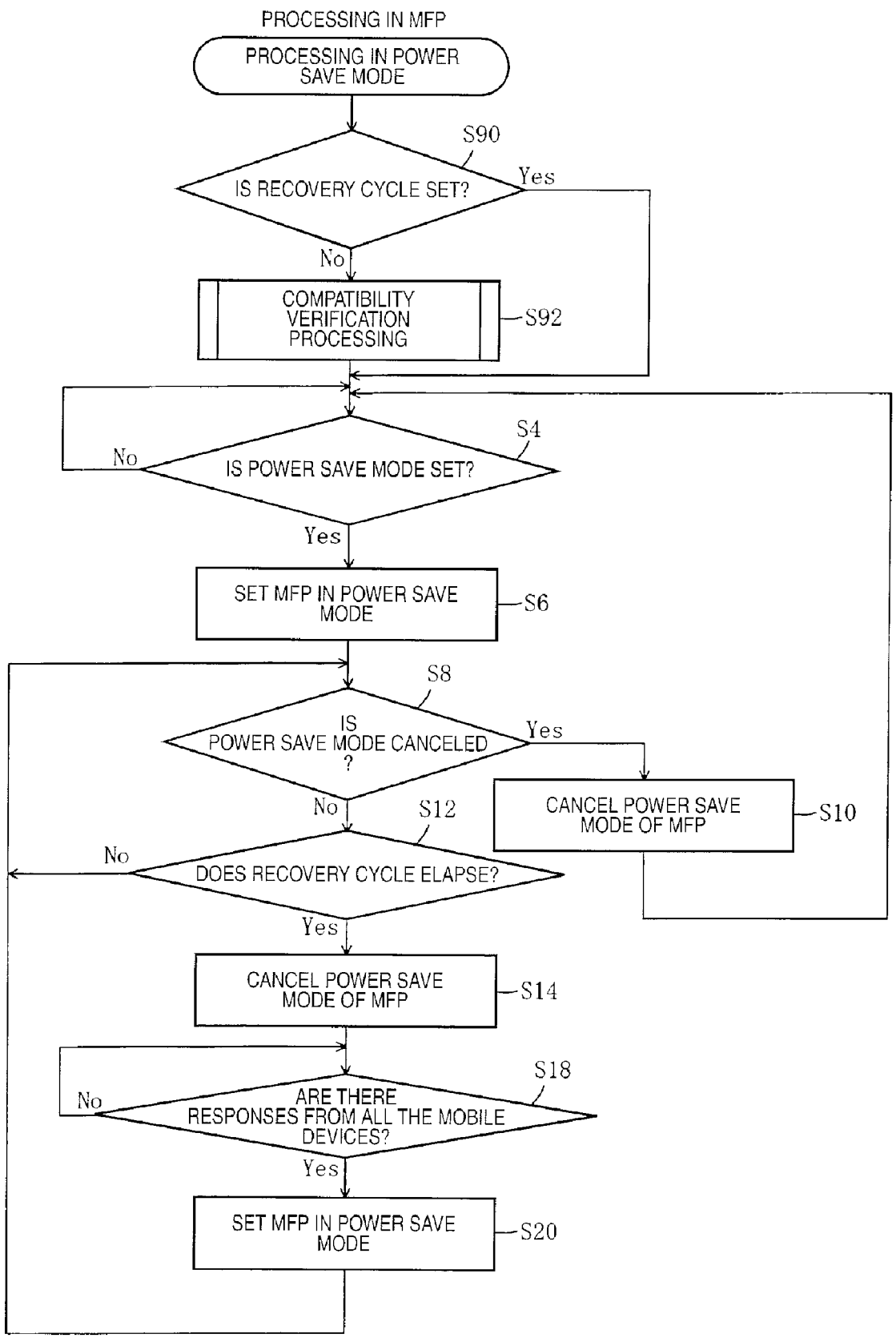
FIG. 9 is a flowchart showing processing in a power save mode executed in the MFP according to the third exemplary embodiment.

Next, the operation of the MFP 1 in the third exemplary embodiment will be described by using a flowchart. FIG. 9 is the flowchart showing processing in a power save mode executed in the MFP 1 in the third exemplary embodiment. As shown in FIG. 9, the processing in a power save mode in the third exemplary embodiment is different from the processing in a power save mode in the first exemplary embodiment (refer to FIG. 4) in the point that the processing at S2 is not provided and processings at S90 and S92 are added. Incidentally, S92 is one example of a cycle determining unit. In the flowchart shown in FIG. 9, portions which are the same as those in the flowchart shown in FIG. 4 are denoted by common reference numerals, and descriptions thereof will be omitted.

As shown in FIG. 9, in the processing in a power save mode in the third exemplary embodiment, first, the MFP 1 judges whether or not a recovery cycle is set in the recovery cycle memory 14a (S90). When the judgment at S90 is affirmative (S90: Yes), the MFP 1 proceeds to the processing at S4, and executes the same processing described in the first exemplary embodiment.

In contrast, when the judgment at S90 is negative (S90: No), the MFP 1 executes compatibility verification processing (S92). The compatibility verification processing is processing to determine a recovery cycle corresponding to a time-out period of the mobile device by making the wireless communication control circuit 22 operate every test cycle. The details will be described with reference to FIG. 10.

Next, the MFP 1 proceeds to the processing at S4, and when the MFP 1 is instructed to make a transition to a power save mode, the MFP 1 stops the operation of the wireless communication control circuit 22, and makes the operation temporarily recover every determined recovery cycle.

Figure 10:
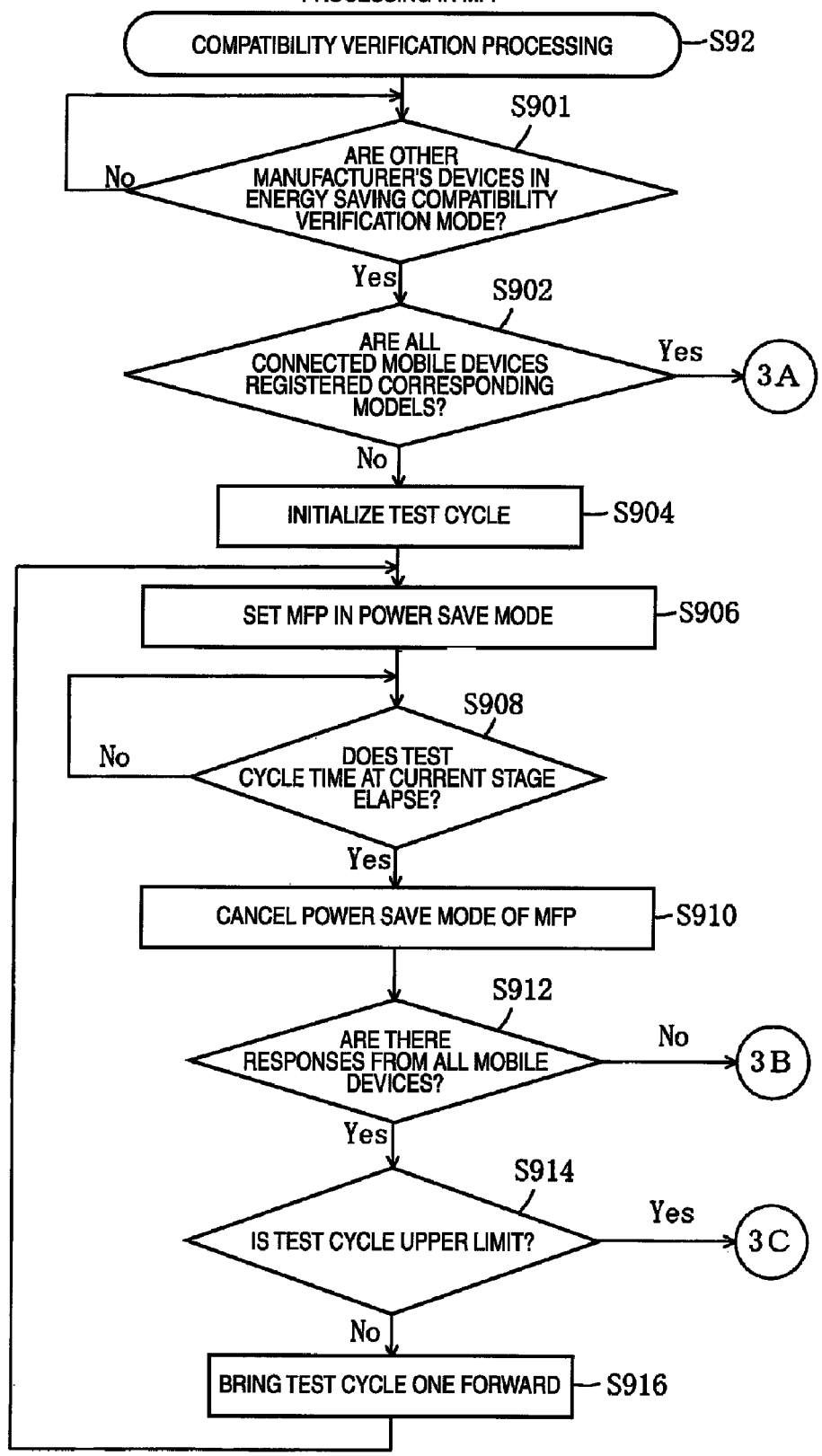
FIG. 10 is a flowchart showing the compatibility verification processing executed in the MFP according to the third exemplary embodiment.

FIG. 10 is a flowchart showing the compatibility verification processing (S92) executed in the MFP 1 in the third exemplary embodiment.

In the compatibility verification processing (S92), first, the user judges whether or not the MFP 1 is instructed to make a transition to a compatibility verification mode (S901). The user is capable of instructing a transition to a compatibility verification mode by performing a predetermined operation by the operation key 15 of the MFP 1.

When the judgment at S901 is negative (S901: No), the MFP 1 stands by for processing. In contrast, when the judgment at S901 is affirmative (S901: Yes), the MFP 1 reads a model type of the mobile device 51 registered with the MFP 1 from the use mobile device registering memory 14b (refer to FIG. 2), and the MFP 1 judges whether or not the mobile device is a known corresponding model stored in the corresponding model information memory 12a (S902, one example of a mobile device response judging unit). Incidentally, when a plurality of mobile devices are registered with the MFP 1, the MFP 1 judges whether or not all the registered mobile devices are known corresponding models (S902).

When the judgment at S902 is affirmative (S902: Yes), the MFP 1 proceeds to the processing shown in FIG. 11.

Figure 11:
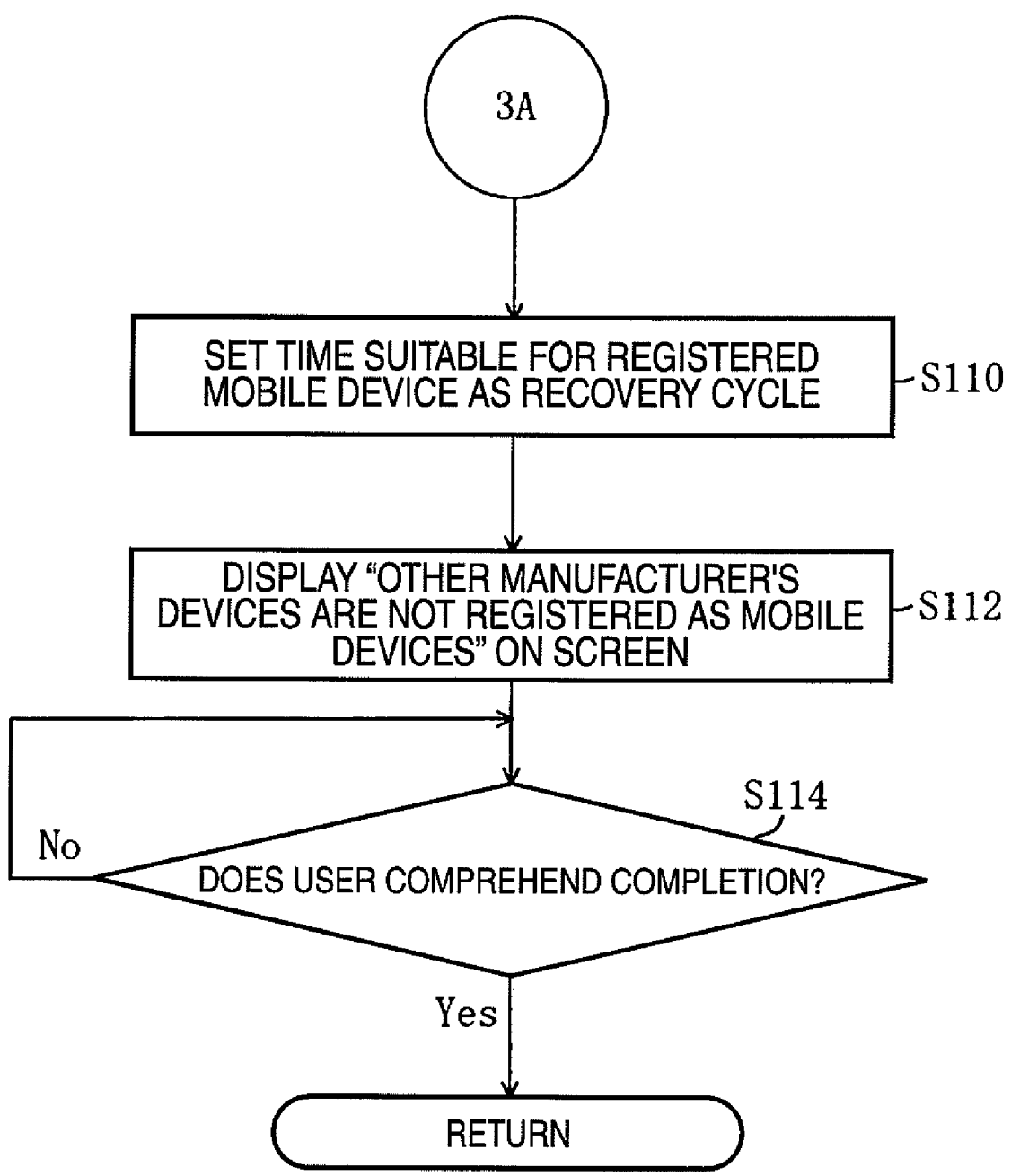
FIG. 11 is a flowchart showing processing executed in the MFP according to the third exemplary embodiment when model types of all the registered mobile devices are known corresponding models.

FIG. 11 is a flowchart showing processing executed when the model types of all the mobile devices registered with the MFP 1 are known corresponding models. As shown in FIG. 11, first, the MFP 1 determines a cycle shorter than the minimum time among the time-out periods of the registered mobile devices as a recovery cycle, and sets the recovery cycle in the recovery cycle memory 14a (refer to FIG. 2) (S110, one example of a cycle determining unit). In this way, it is easy to determine an appropriate recovery cycle in which all the registered mobile devices can be restrained from stopping their searches.

Next, the MFP 1 displays a message of "Other manufacturer's devices are not registered as mobile devices" on the LCD 16 (refer to FIG. 1) (S112).

The MFP 1 judges whether or not the user comprehends that the compatibility verification processing (S92) will be completed (S114). When the judgment at S114 is negative (S114: No), the MFP 1 stands by for processing. However, when the judgment at S114 is affirmative (S114: Yes), the MFP 1 completes the compatibility verification processing (S92), and returns to the processing at S4 shown in FIG. 9, and the MFP 1 makes the wireless communication control circuit 22 operate according to the set recovery cycle.

To return to FIG. 10, the description will be continued. When the judgment at S902 is negative (S902: No), the MFP 1 sets a value at the head of the test cycle memory (refer to FIG. 8) as a test cycle. Then, the MFP 1 stops supplying electric power to the wireless communication control circuit 22 to stop the operation (S906). Thereby, the MFP 1 makes a transition to a power save mode.

Next, the MFP 1 judges whether or not a time from the stoppage of the operation of the wireless communication control circuit 22 reaches a currently set test cycle (S908). When the judgment at S908 is negative (S908: No), the MFP 1 stands by for processing.

In contrast, when the judgment at S908 is affirmative (S908: Yes), the MFP 1 makes the operation of the wireless communication control circuit 22 recover (S910). Then, after the recovery of the operation of the wireless communication control circuit 22 by the processing at S910, the MFP 1 judges whether or not communication with the mobile device 51 is established (S912, one example of a mobile device response judging unit). Incidentally, when a plurality of mobile devices are registered with the MFP 1, the MFP 1 judges whether or not communications with all the plurality of mobile devices are established at the judgment at S912.

In contrast, when the judgment at S912 is affirmative (S912: Yes), next, the MFP 1 judges whether or not the currently set test cycle is the upper limit in the test cycle memory, i.e., the final value (for example, 500 minutes in the third exemplary embodiment) (S914, one example of an extension limiting unit).

When the judgment at S914 is affirmative (S914: Yes), the MFP 1 proceeds to the processing shown in FIG. 12B. However, the details will be described later.

In contrast, when the judgment at S914 is negative (S914: No), the MFP 1 reads a following value from the test cycle memory to set the value as a test cycle, to extend the test cycle (S916, one example of an extension unit). Thereafter, the MFP 1 returns to S906 and repeats the processings. In this way, a synchronization signal is generated from the wireless communication control circuit 22 every test cycle (S910), and every time the wireless communication control circuit 22 generates a synchronization signal, the MFP 1 judges whether or not communications with all the registered mobile devices are established (S912) Every time the judgment at S914 is negative (S914: No), the MFP 1 extends the test cycle (S916).

Figure 12A:
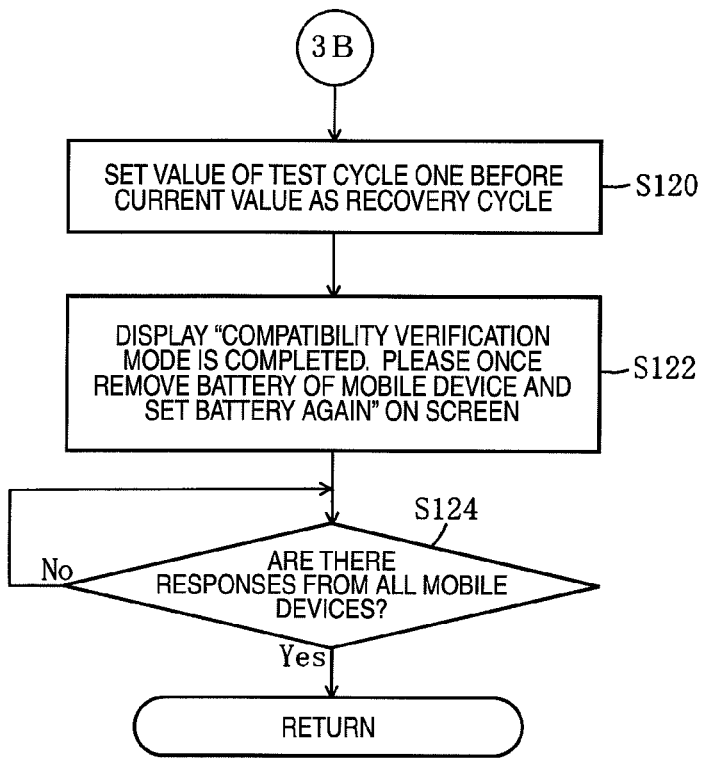
FIG. 12A is a flowchart showing processing executed in the MFP according to the third exemplary embodiment when communications with the mobile devices cannot be established.
Figure 12B:
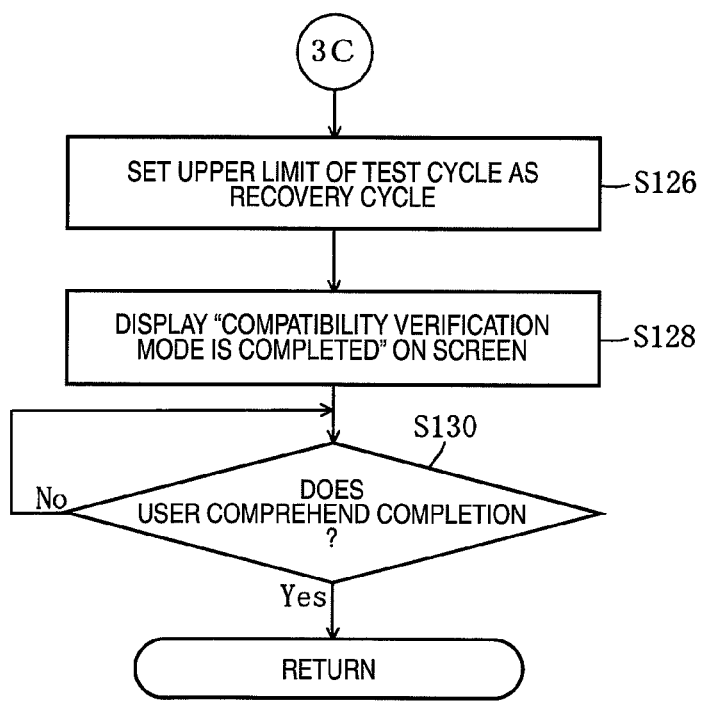
FIG. 12B shows processing executed in a case in which it is judged that communications with all the mobile devices are established and a currently set test cycle is the upper limit of a test cycle.

Then, while repeating the processings, when the MFP 1 judges that communications with the mobile devices are not established even after the elapse of the ON-maximum time at the processing at S912, the MFP 1 proceeds to the processing shown in FIG. 12B. Incidentally, when a plurality of mobile devices are registered with the MFP 1, and there is even one mobile device with which the MFP 1 cannot establish communication, the judgment at S912 is negative.

FIG. 12A is a flowchart showing processing executed when communications with mobile devices cannot be established. When a test cycle is longer than the time-out periods of the mobile devices, there is an extremely high probability that the mobile devices cannot receive a synchronization signal from the MFP 1 within their time-out periods, to stop their searches.

Then, as shown in FIG. 12A, first, the MFP 1 sets a value of a test cycle set one before a currently set test cycle as a recovery cycle in the test cycle memory 14a (refer to FIG. 2) (S120, one example of a cycle determining unit). That is, the MFP 1 determines a test cycle set one before a test cycle when it is judged that there is no response from at least one mobile device of the registered mobile devices, as a recovery cycle. Because the communications with the mobile devices are established when the test cycle set one before is used, the MFP 1 determines this test cycle as a recovery cycle, to be capable of restraining all the registered mobile devices from stopping their searches. Further, the MFP 1 determines a recovery cycle as long as possible, to be capable of achieving a higher electric power saving effect.

Next, when the recovery cycle is determined, the MFP 1 outputs a message that instructs to cancel the stoppage of searches of the mobile devices (S122, one example of a message outputting unit). Incidentally, this message is a message that instructs to temporarily remove a battery of a corresponding mobile device. Specifically, for example, a message of "Compatibility verification mode is completed. Please once take out the battery of the mobile device and set the battery again" is displayed on the LCD 16 (refer to FIG. 1).

In this way, it is possible for the user to notice the stoppage of searches of the mobile device for determining a recovery cycle, to take appropriate measures. Further, the mobile device is reset by temporarily removing the battery of the mobile device, to be able to cancel the state of stopping their searches. Further, by instructing to temporarily remove the battery with a message, for example, even in a case in which a mobile device by a manufacturer different from that of the MFP 1 is registered with the MFP 1, and a method for canceling a stoppage of searches is unclear, the user can be made to know a method for securely canceling a stoppage of searches.

Incidentally, when a plurality of mobile devices are registered with the MFP 1, a message to inform of the mobile device may be displayed at the same time in order to cancel the stoppage of searches of a mobile device judged that communication therewith is not established, of the registered mobile devices at the judgment at S912.

Next, the MFP 1 judges whether or not communications with all the mobile devices are established (S124). At this time, because the wireless communication control circuit 22 continues to operate, if the state of stopping searches of the mobile devices is canceled, communications with all the mobile devices are established. When the judgment at S124 is negative (S124: No), the MFP 1 stands by for processing. However, when the state of stopping searches of the mobile devices is canceled, and the judgment at S124 is affirmative (S124: Yes), the MFP 1 returns to the processing at S4 shown in FIG. 9, and makes the wireless communication control circuit 22 operate according to the set recovery cycle.

Next, a case in which communications with all the mobile devices are established regardless of a case in which the final value in the test cycle memory, i.e., the upper limit of a test cycle is set will be described with reference to FIG. 12B.

FIG. 12B shows processing executed when it is judged that communications with all the mobile devices are established and a currently set test cycle is the upper limit of a test cycle (S914: Yes).

In this case, it is anticipated that the time-out periods of the registered mobile devices are longer than the upper limit of a test time. Therefore, in the third exemplary embodiment, as shown in FIG. 12B, a final value in the test cycle memory (the upper limit of a test cycle) is determined as a recovery cycle, to be set in the recovery cycle memory 14a (S126).

Next, a message of "Compatibility verification mode is completed" is displayed on the LCD 16 (S128).

Then, the MFP 1 judges whether or not the user comprehends that the compatibility verification processing (S92) will be completed (S130). When the judgment at S130 is negative (S130: No), the MFP 1 stands by for processing. However, when the judgment at S130 is affirmative (S130: Yes), the MFP 1 completes the compatibility verification processing (S92). The MFP 1 returns to the processing at S4 shown in FIG. 9, and makes the wireless communication control circuit 22 operate according to the set recovery cycle.

In this way, in the third exemplary embodiment as well, because the MFP 1 makes the operation of the wireless communication control circuit 22 recover according to a recovery cycle corresponding to a time-out period of the mobile device 51, the MFP 1 is capable of making the operation of the wireless communication control circuit 22 recover in an appropriate timing corresponding to the time-out period required for the mobile device 51 to stop searches.

Fourth Exemplary Embodiment

A fourth exemplary embodiment of the invention will be described with reference to FIGS. 13 to 17. The fourth exemplary embodiment can be applied to a case in which one mobile device or three or more mobile devices are registered with the MFP 1. However, for ease of explanation, the fourth exemplary embodiment will be described on the assumption that two mobile devices 51 and 52 ate registered with the MFP 1.

Incidentally, the fourth exemplary embodiment will be described on the assumption that the external configuration and the electrical configuration of the MFP 1 are the same as those of the MFP 1 in the first to third exemplary embodiments.

Further, in the fourth exemplary embodiment, compatibility verification processing (refer to FIG. 16) to verify a time-out period of a registered mobile device is executed. However, in the compatibility verification processing in the third exemplary embodiment, the upper limit of a test cycle is a fixed value set in advance. In contrast, in the compatibility verification processing in the fourth exemplary embodiment, an upper limit of a test cycle is set on the basis of a time-out period of a known mobile device, which is the different point from the third exemplary embodiment. In the following description, portions which are the same as those in the third exemplary embodiment are denoted by the same reference numerals, and descriptions thereof will be omitted. Only portions different from those in the third exemplary embodiment will be described.

Figure 13:
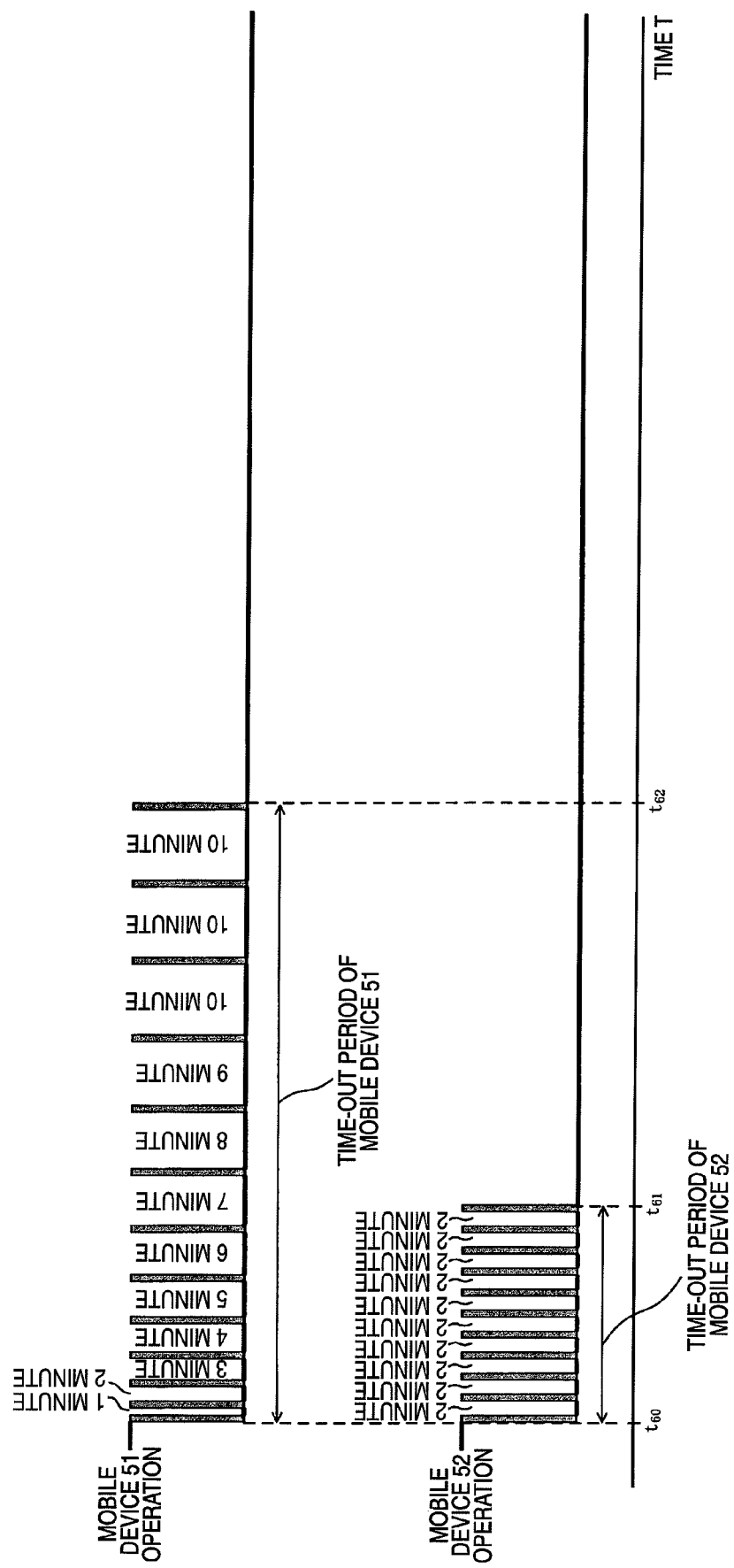
FIG. 13 is a timing chart showing operation timings of mobile devices registered with an MFP according to the fourth exemplary embodiment.

FIG. 13 is a timing chart showing operation timings of the mobile devices 51 and 52 registered with the MFP 1. As shown in FIG. 13, when the communications with the main device are shut off, the mobile devices 51 and 52 respectively start searches. However, the mobile devices 51 and 52 are different in their time-out periods in some cases. FIG. 13 shows an example in which the time-out period of the mobile device 51 is from time $t_{60}$ to time $t_{62}$, and the time-out period of the mobile device 52 is from time $t_{60}$ to time $t_{61}$.

Figure 14:
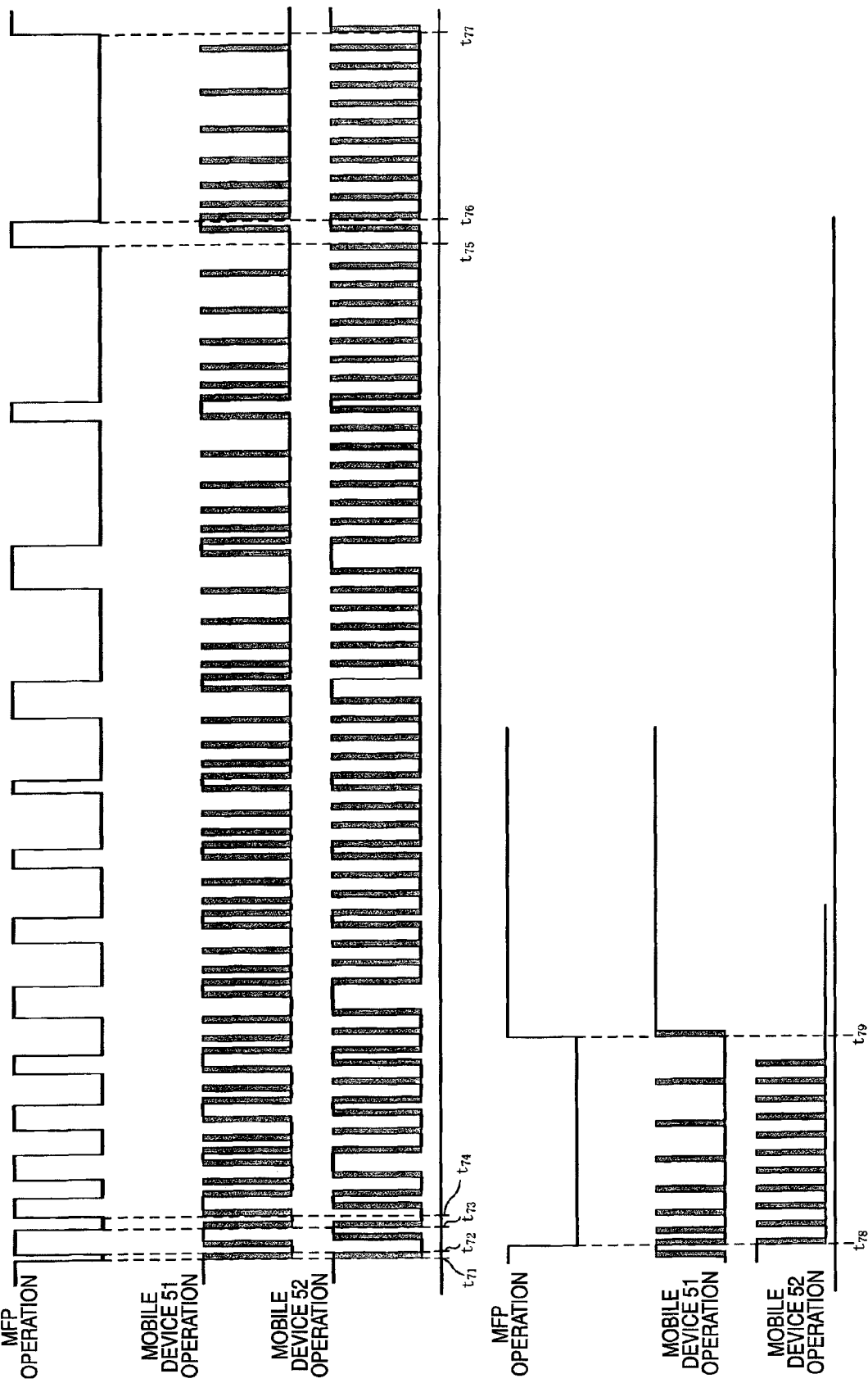
FIG. 14 is a timing chart showing operation timings of the MFP and the mobile devices during execution of the compatibility verification processing in the MFP according to the fourth exemplary embodiment.

FIG. 14 is a timing chart showing operation timings of the MFP 1 and the mobile devices 51 and 52 during execution of the compatibility verification processing in the MFP 1. In the compatibility verification processing executed in the fourth exemplary embodiment as well, basically, in the same way as in the compatibility verification processing executed in the third exemplary embodiment, the MFP 1 judges whether or not any one of the mobile devices 51 and 52 times out, and when both of the mobile devices do not time out, the MFP 1 extends a test cycle.

In the example shown in FIG. 14, when a test cycle reaches a length from time $t_{78}$ to time $t_{79}$, the mobile device 51 does not time out, but the mobile device 52 times out. Therefore, in the compatibility verification processing, the MFP 1 sets a test cycle (a time from time $t_{76}$ to time $t_{77}$) set one before the test cycle, as a recovery cycle.

Figure 15:
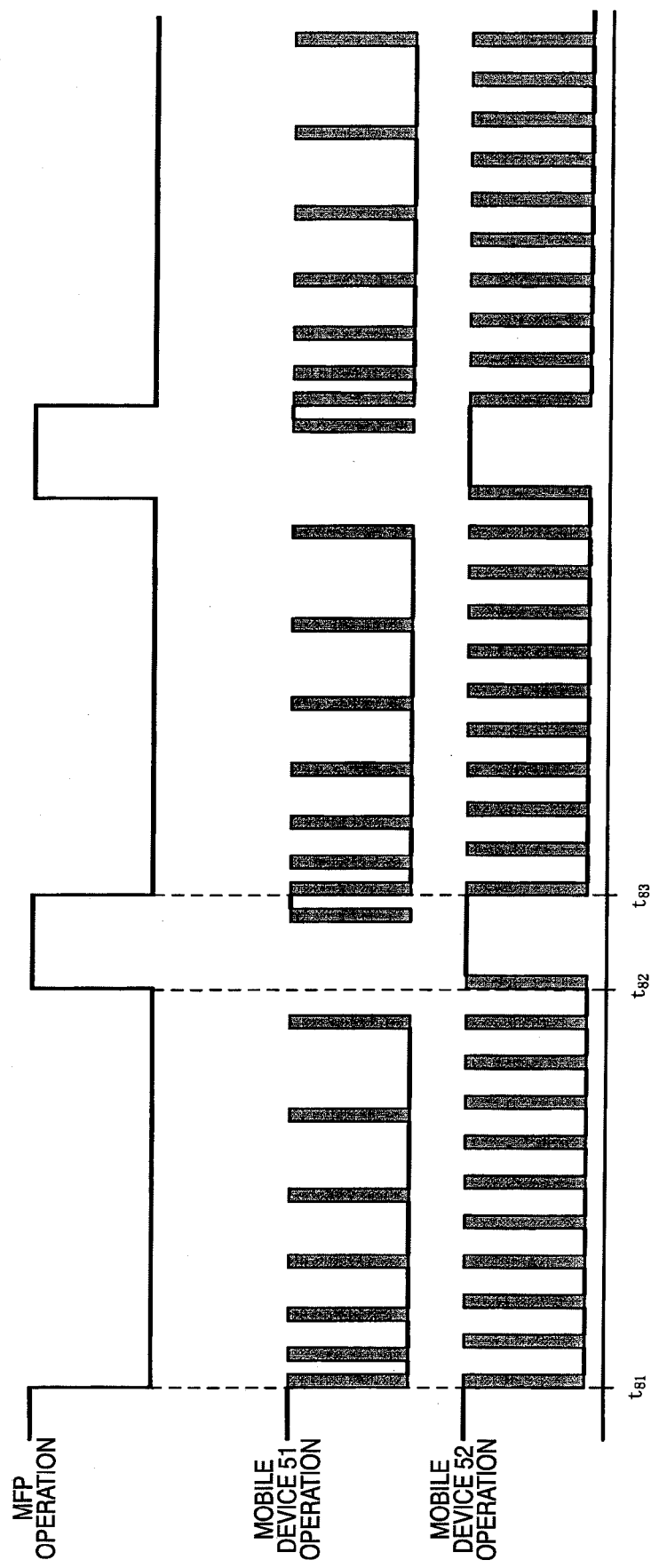
FIG. 15 is a timing chart showing operation timings of the MFP in the fourth exemplary embodiment and the mobile devices when the state of stopping searches of the mobile device is canceled.

FIG. 15 is a timing chart showing operation timings of the MFP 1 and the mobile devices 51 and 52 when the state of stopping searches of the mobile device 52 is canceled after a recovery cycle is determined as described above. As shown in FIG. 15, the MFP 1 makes the wireless communication control circuit 22 operate every determined recovery cycle, to restrain the mobile devices 51 and 52 from stopping their searches.

Figure 16:
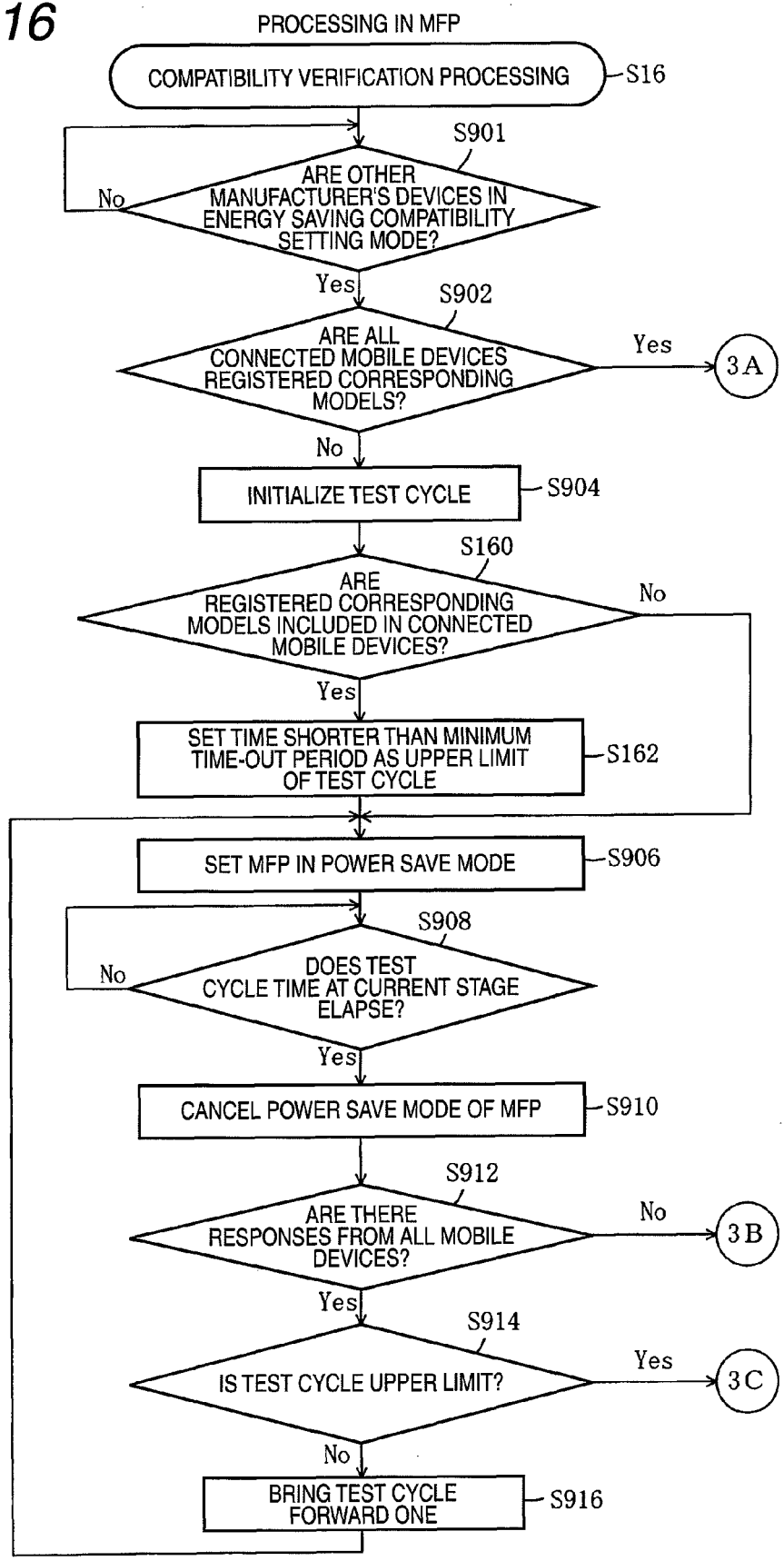
FIG. 16 is a flowchart showing the compatibility verification processing executed in the MFP according to the fourth exemplary embodiment.

FIG. 16 is a flowchart showing the compatibility verification processing (S16, one example of a cycle determining unit) executed in the MFP 1 in the fourth exemplary embodiment. The compatibility verification processing (S16) is processing executed in place of the compatibility verification processing (S92) shown in the flowchart of FIG. 9.

As shown in FIG. 16, the compatibility verification processing (S16) in the fourth exemplary embodiment is different in the point that processings at S160 and S162 are added to the compatibility verification processing (S92) in the third exemplary embodiment. However, the other portions are the same as those in the compatibility verification processing (S92) in the third exemplary embodiment. Therefore, in the flowchart shown in FIG. 16, portions which are the same as those in the flowchart shown in FIG. 10 are denoted by common reference numerals, and descriptions thereof will be omitted.

S160 and S162 are processings for setting an upper limit of a test cycle. First, the MFP 1 judges whether or not at least one mobile device of the registered mobile devices is a known model type (S160, one example of a mobile device model type identifying unit). When the judgment at S160 is negative (S160: No), the MFP 1 skips the processing at S162. However, when the judgment at S160 is affirmative (S160: Yes), the MFP 1 temporarily erases a value longer than a minimum time-out period among the time-out periods of the mobile devices whose model types are known, i.e., corresponding models from the test cycle memory shown in FIG. 8, to set an upper limit of a test cycle (S162, one example of an upper limit setting unit). At this time, the MFP 1 may add a time slightly shorter than a minimum time-out period (for example, 30 seconds) to the tail end of the test cycle memory.

Then, the MFP 1 repeats the processings at S906 to S916 for extending the test cycle until one of the mobile devices 51 and 52 times out by using the upper limit of a test cycle set in this way. When the judgment at S912 is negative (S912: No) before reaching the upper limit of a test cycle, i.e., when one of the mobile devices times out, a recovery cycle is determined as described with reference to FIG. 12A.

In contrast, in a case in which it is judged that both of the mobile devices 51 and 52 do not time out and the test cycle reaches the upper limit, and even when the test cycle reaches the upper limit, communications with all the mobile devices are established, the MFP 1 determines the upper limit of a test cycle, as a recovery cycle (S126) (refer to FIG. 12B).

A case in which a mobile device 53 whose time-out period is unknown and a mobile device 54 whose time-out period is known are registered with the MFP 1 in the fourth exemplary embodiment will be described with reference to FIG. 17. FIG. 17 is a timing chart showing operation timings of the MFP 1 in the fourth exemplary embodiment and the mobile devices 53 and 54 registered with the MFP 1.

Here, a time slightly shorter than a time-out period (for example, 30 seconds) of the mobile device 54 which is known is set as the upper limit of a test cycle. In contrast, a time-out period of the mobile device 53 which is unknown is set to, for example, 45 minutes in practice.

In this case, for example, in a case in which the MFP 1 judges that, even though the test cycle reaches the upper limit at time $t_{92}$, communications with all the mobile devices are established at time $t_{93}$, the MFP 1 sets the upper limit of a test cycle, as a recovery cycle, and continues the processing directly.

In this way, according to the fourth exemplary embodiment, because a value shorter than a time-out period of a registered mobile device is set as an upper limit of a test cycle, and a test cycle is not extended more than the upper limit, there is a high probability that a recovery cycle may be determined before the mobile device times out. Therefore, a recovery cycle can be determined in a short time, and the need for making a user carry out a troublesome operation to reset a mobile device can be reduced.

The invention has been described on the basis of the exemplary embodiments. However, the invention is not limited to any of the above-described exemplary embodiments, and it is easy to conjecture that various improvements and modifications are possible within a range which does not deviate from the gist of the invention.

What is claimed is:

1. A main device of a cordless telephone system configured to perform communication with at least one additional device, each of the at least one additional device comprising:
a search unit configured to search intermittently for a radio wave generated from the main device; and
a search stopping unit configured to stop execution of the search unit after a state in which the search unit does not receive a radio wave continues for a predetermined time,
wherein the main device comprises:
a radio wave generating unit configured to generate the radio wave;
an operation stopping unit configured to stop an operation of the radio wave generating unit; and
a temporary returning unit configured to recover temporarily the operation of the radio wave generating unit to generate a radio wave and configured to stop the operation of the radio wave generating unit after the at least one additional device executes multiple searches by using the search unit after stopping the operation of the radio wave generating unit, but before the predetermined time elapses, wherein the temporary returning unit comprises:
a recovery unit configured to recover the operation of the radio wave generating unit;
a judging unit configured to judge whether communication with the at least one additional device is established after the recovery of the operation by the recovery unit; and
a re-stop unit configured to stop the operation of the radio wave generating unit under a condition that the judging unit judges that communication with all of the at least one additional device is established,
wherein the search unit is configured to execute searches a predetermined number of times within the predetermined time, and
wherein the temporary returning unit is configured to recover temporarily the operation of the radio wave generating unit to generate a radio wave while the at least one additional device executes a search corresponding to the predetermined number-th search, which is counted from the stoppage of the operation of the radio wave generating unit by the operation stopping unit or the re-stop unit, by using the search unit.

2. The main device of the cordless telephone system according to claim 1, further comprising:
a cycle determining unit configured to determine a recovery cycle corresponding to the predetermined time,
wherein the temporary returning unit is configured to recover the operation of the radio wave generating unit in the recovery cycle determined by the cycle determining unit.

3. A main device of a cordless telephone system configured to perform communication with at least one additional device, each of the at least one additional device comprising:
a search unit configured to search intermittently for a radio wave generated from the main device; and
a search stopping unit configured to stop execution of the search unit after a state in which the search unit does not receive a radio wave continues for a predetermined time,
the main device comprising:
a radio wave generating unit configured to generate the radio wave;
an operation stopping unit configured to stop an operation of the radio wave generating unit; and
a temporary returning unit configured to recover temporarily the operation of the radio wave generating unit to generate a radio wave and stops the operation of the radio wave generating unit after the at least one additional device executes multiple searches by using the search unit after stopping the operation of the radio wave generating unit, but before the predetermined time elapses, wherein the temporary returning unit comprises:
a recovery unit configured to recover the operation of the radio wave generating unit;
a judging unit configured to judge whether communication with the at least one additional device is established after the recovery of the operation by the recovery unit; and
a re-stop unit configured to stop the operation of the radio wave generating unit under a condition that the judging unit judges that communication with all of the at least one additional device is established;
a cycle determining unit configured to determine a recovery cycle corresponding to the predetermined time; and
an additional device model type identifying unit configured to identify model types of the at least one additional device,
wherein the temporary returning unit is configured to recover the operation of the radio wave generating unit in the recovery cycle determined by the cycle determining unit, and
wherein the cycle determining unit is configured to determine a cycle shorter than a shortest time among predetermined times corresponding to the at least one additional device as the recovery cycle when the additional device model type identifying unit identifies that all the model types of the at least one additional device are known.

4. The main device of the cordless telephone system according to claim 3, wherein the cycle determining unit comprises:
a test unit configured to perform generation of a radio wave by the radio wave generating unit every predetermined test cycle;
an additional device response judging unit configured to judge whether communication with the at least one additional devices is established every time the radio wave generating unit generates a radio wave; and
an extension unit configured to extend the test cycle when the additional device response judging unit judges that communication with all of the at least one additional device is established, wherein the cycle determining unit is configured to determine a cycle shorter than a test cycle when the additional device response judging unit judges that there is no response from at least one of the at least one additional device, as the recovery cycle.

5. The main device of the cordless telephone system according to claim 4, further comprising:

an extension limiting unit configured to limit extension of the test cycle by the extension unit up to a predetermined upper limit, wherein the cycle determining unit is configured to determine the predetermined upper limit as the recovery cycle when the test cycle reaches the predetermined upper limit limited by the extension limiting unit and the additional device response judging unit judges that the communication with all of the at least one additional device is established.

6. The main device of the cordless telephone system according to claim 5, further comprising:

an upper limit setting unit configured to set a cycle shorter than a shortest time among predetermined times corresponding to the at least one additional device as the recovery cycle when the additional device model type identifying unit identifies that at least one of the at least one additional device is known.

7. The main device of the cordless telephone system according to claim 4, further comprising:

a message outputting unit configured to output a message, wherein, when the recovery cycle is determined by the cycle determining unit, the message outputting unit is configured to output the message that instructs to cancel an operation of the search stopping unit of the additional device which is judged that communication therewith is not established by the additional device response judging unit.

8. The main device of the cordless telephone system according to claim 6, wherein the message output by the message outputting unit is a message that instructs to temporarily remove a battery of a corresponding additional device.

9. The main device of the cordless telephone system according to claim 1, further comprising:

a recovery cycle memory, to which a recovery cycle corresponding to the predetermined time is set, wherein the recovery cycle is set to a cycle shorter than a shortest time among predetermined times corresponding to the at least one additional device.

10. A cordless telephone system comprising:

a main device comprising:
  a radio wave generating unit configured to generate a radio wave; and
  an operation stopping unit configured to stop an operation of the radio wave generating unit; and
at least one additional device configured to connect with the main device via a wireless communication, the additional device comprising:
  a search unit configured to search intermittently for the radio wave generated from the main device; and
  a search stopping unit configured to stop execution of the search unit after a state in which the search unit does not receive a radio wave continues for a predetermined time,
wherein the main device further comprises:
  a temporary returning unit configured to recover temporarily the operation of the radio wave generating unit to generate a radio wave and configured to stop the operation of the radio wave generating unit after the at least one additional device executes multiple searches by using the search unit after stopping the operation of the radio wave generating unit, but before the predetermined time elapses wherein the temporary returning unit comprises:
  a recovery unit configured to recover the operation of the radio wave generating unit;
  a judging unit configured to judge whether communication with the at least one additional device is established after the recovery unit recovers the operation; and
  a re-stop unit configured to stop the operation of the radio wave generating unit under a condition that the judging unit judges that communication with all additional devices of the at least one additional device is established,
wherein the search unit of the at least one additional device is configured to execute one or more searches a predetermined number of times within the predetermined time, and
wherein the temporary returning unit is configured to recover temporarily the operation of the radio wave generating unit to generate a radio wave while the at least one additional device executes a search corresponding to the predetermined number-th search, which is counted from the stoppage of the operation of the radio wave generating unit by one or more of the operation stopping unit and the re-stop unit, by using the search unit.

* * * * *